(12) United States Patent
Furukawa et al.

(10) Patent No.: US 10,445,404 B2
(45) Date of Patent: Oct. 15, 2019

(54) INFORMATION PROCESSING APPARATUS AND NON-TRANSITORY COMPUTER READABLE MEDIUM

(71) Applicant: FUJI XEROX Co., Ltd., Tokyo (JP)

(72) Inventors: Shigehiro Furukawa, Kanagawa (JP); Tomoyuki Ito, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 28 days.

(21) Appl. No.: 15/916,623

(22) Filed: Mar. 9, 2018

(65) Prior Publication Data

US 2019/0057062 A1 Feb. 21, 2019

(30) Foreign Application Priority Data

Aug. 15, 2017 (JP) ................. 2017-156694

(51) Int. Cl.
| | |
|---|---|
| *G06F 17/17* | (2006.01) |
| *G06F 7/48* | (2006.01) |
| *G06F 17/18* | (2006.01) |
| *G06F 17/11* | (2006.01) |
| *G06F 16/904* | (2019.01) |
| *G06F 16/93* | (2019.01) |

(52) U.S. Cl.
CPC ............. *G06F 17/17* (2013.01); *G06F 7/48* (2013.01); *G06F 16/904* (2019.01); *G06F 16/94* (2019.01); *G06F 17/11* (2013.01); *G06F 17/18* (2013.01)

(58) Field of Classification Search
CPC ........ G06F 17/17; G06F 16/904; G06F 16/94; G06F 7/48; G06F 17/11; G06F 17/18
USPC ........................................................ 708/131
See application file for complete search history.

(56) References Cited

U.S. PATENT DOCUMENTS

| | | | | |
|---|---|---|---|---|
| 2001/0011265 A1* | 8/2001 | Cuan | ...................... | G06F 16/958 |
| 2002/0069077 A1* | 6/2002 | Brophy | ................ | G06Q 10/067 |
| | | | | 705/322 |
| 2005/0071350 A1* | 3/2005 | Artale | ..................... | G06Q 10/06 |
| 2014/0122117 A1* | 5/2014 | Masarie, Jr. | ........... | G06Q 50/22 |
| | | | | 705/3 |
| 2017/0206034 A1* | 7/2017 | Fetik | ..................... | G06F 3/0653 |

FOREIGN PATENT DOCUMENTS

JP 2016-081185 A 5/2016

\* cited by examiner

*Primary Examiner* — Tan V Mai
(74) *Attorney, Agent, or Firm* — Sughrue Mion, PLLC

(57) ABSTRACT

An information processing apparatus includes an extraction unit that extracts, if a third axis is inserted between a first axis and a second axis adjacent to each other in a deployment table, a relations diagram associated with the deployment table and an insertion unit that inserts, in the relations diagram, a third item relating to an axis item of a the third axis between a first item relating to an axis item of the first axis and a second item relating to an axis item of the second axis.

8 Claims, 22 Drawing Sheets

FIG. 9

| | | |
|---|---|---|
| 905 | RELATIONS DIAGRAM ID | |
| 910 | RELATIONS DIAGRAM NAME | |
| 915 | USER | |
| 920 | TIME | |
| 925 | NUMBER OF ITEMS | |
| 930 | ITEM ID | |
| | ⋮ | |
| 935 | NUMBER OF ARROWS | |
| 940 | ARROW ID | |
| | ⋮ | |

| | | |
|---|---|---|
| 1005 | ITEM ID | |
| 1010 | DETAILS OF ITEM | |
| 1015 | NUMBER OF EFFECT ITEMS | |
| 1020 | EFFECT ITEM ID | |
| | ⋮ | |

| | | |
|---|---|---|
| 1105 | ARROW ID | |
| 1110 | CAUSE ITEM ID | |
| 1115 | EFFECT ITEM ID | |
| 1120 | ATTRIBUTE | |

| | |
|---|---|
| 1205 — DEPLOYMENT TABLE ID | |
| 1210 — DEPLOYMENT TABLE NAME | |
| 1215 — USER | |
| 1220 — TIME | |
| 1225 — BASE RELATIONS DIAGRAM ID | |
| 1230 — AXIS A NAME | |
| 1235 — NUMBER OF AXIS ITEMS | |
| 1240 — AXIS ITEM ID | |
| ⋮ | |
| 1245 — NUMBER OF PIECES OF CAUSE-AND-EFFECT INFORMATION | |
| 1250 — CAUSE-AND-EFFECT INFORMATION ID | |
| ⋮ | |

| | |
|---|---|
| 1305 — AXIS ITEM ID | |
| 1310 — AXIS ITEM NAME | |
| 1315 — AXIS | |

| | |
|---|---|
| 1405 — CAUSE-AND-EFFECT INFORMATION ID | |
| 1410 — AXIS ITEM ID (A) | |
| 1415 — AXIS ITEM ID (B) | |
| 1420 — ATTRIBUTE | |

| 1505 | 1510 |
|---|---|
| RELATIONS DIAGRAM ID | DEPLOYMENT TABLE ID |
|  |  |

| 1605 | 1610 |
|---|---|
| ITEM ID | AXIS ITEM ID |
|  |  |

| 1705 | 1710 |
|---|---|
| ARROW ID | CAUSE-AND-EFFECT INFORMATION ID |
|  |  |

|   |   |   |
|---|---|---|
| A | ○ |   |
| B |   | ○ |
| ✕ | FACTOR IN A | FACTOR IN B |
| C | ○ |   |
| D | ○ |   |
| E |   | ○ |

FIG. 28

|   |   |   |   |
|---|---|---|---|
| A | ○ | ○ |   |
| B |   |   | ○ |
| ✕ | RESULT OF C | RESULT OF D | RESULT OF E |
| C | ○ |   |   |
| D |   | ○ |   |
| E |   |   | ○ |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-156694 filed Aug. 15, 2017.

BACKGROUND

Technical Field

The present invention relates to an information processing apparatus and a non-transitory computer readable medium.

SUMMARY

According to an aspect of the invention, there is provided an information processing apparatus including an extraction unit that extracts, if a third axis is inserted between a first axis and a second axis adjacent to each other in a deployment table, a relations diagram associated with the deployment table, and an insertion unit that inserts, in the relations diagram, a third item relating to an axis item of a the third axis between a first item relating to an axis item of the first axis and a second item relating to an axis item of the second axis.

BRIEF DESCRIPTION OF THE DRAWINGS

An exemplary embodiment of the present invention will be described in detail based on the following figures, wherein:

FIG. 9 is a diagram illustrating an example of the data structure of a relations diagram information table;

FIG. 10 is a diagram illustrating an example of the data structure of an item information table;

FIG. 11 is a diagram illustrating an example of the data structure of an arrow information table;

FIG. 12 is a diagram illustrating an example of the data structure of a deployment table information table;

FIG. 13 is a diagram illustrating an example of the data structure of an axis item information table;

FIG. 14 is a diagram illustrating an example of the data structure of a cause-and-effect information table;

FIG. 15 is a diagram illustrating an example of the data structure of a relations diagram ID and deployment table ID association table;

FIG. 16 is a diagram illustrating an example of the data structure of an item ID and axis item ID association table;

FIG. 17 is a diagram illustrating an example of the data structure of an arrow ID and cause-and-effect information ID association table;

FIG. 27 is a diagram illustrating another example of the process for a deployment table according to the exemplary embodiment;

FIG. 28 is a diagram illustrating another example of the process for a deployment table according to the exemplary embodiment.

DETAILED DESCRIPTION

Figure 1:
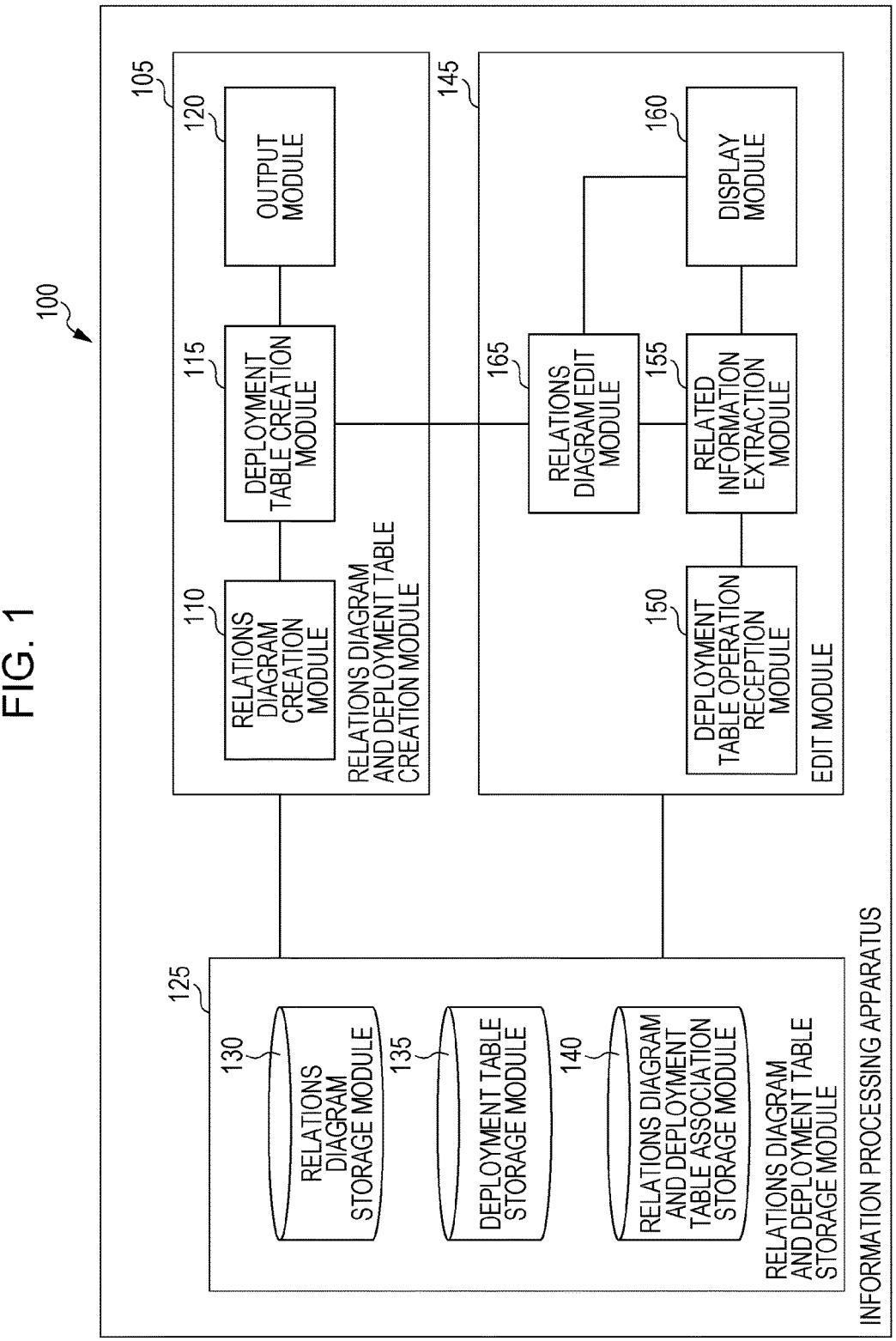
FIG. 1 is a conceptual diagram illustrating the configuration of modules according to an exemplary embodiment.

Before an exemplary embodiment is described, an information processing apparatus that forms a basis of the exemplary embodiment will be described. The following description will facilitate understanding of the exemplary embodiment.

There is a technique in which a relations diagram is created on the basis of definitions of functional items, processes, and dependence between the functional items and a deployment table is generated from the created relations diagram. A technique disclosed in Japanese Unexamined Patent Application Publication No. 2016-081185 provides an information processing apparatus and an information processing program that classify functional items for each process and that make it easier to create tables (hereinafter referred to as "deployment tables") relating to development of quality functions than when classified functional items are layered.

A deployment table is created not only for a single technical process, subsystem, or technical problem but also in order to reconcile plural technical processes, subsystems, or technical problems. As a result of the reconciliation, dependence or cause-and-effect relationships are reviewed, and the deployment table is edited. A relations diagram is created in order to review dependence or cause-and-effect relationships or at a beginning of examination of a technical problem, but the deployment table does not necessarily reflect all items of the created relations diagram and includes only specified items as axis items thereof. That is, the relations diagram includes, unlike the deployment table, information that is not converted. Even if the deployment table is edited, therefore, the relations diagram does not reflect a result of the editing, and an inconsistency occurs between the relations diagram and the deployment table. Because information regarding the deployment table and the relations diagram is utilized as knowledge and design resources, a user might be confused if the information is inconsistent even through the information has been created for the same technique.

A relations diagram can be created in such a way as to be mutually convertible with a deployment table, but in this case, the relations diagram is created under restrictions and therefore loses an advantage thereof in facilitating thinking.

In the following exemplary embodiment, even if a deployment table generated from a relations diagram created without restrictions is edited, the relations diagram and the deployment table reflect a result of the editing.

In addition, as a development process (steps) progresses, requirements such as a quality required for the development process, performance specifically indicating the quality, and an achieving method become more detailed. If this operation for making the requirements more detailed is applied to a relations diagram, an operation for adding the detailed requirements to already configured requirements is performed.

If the development process is applied to a relations diagram based on a technique described in Japanese Unexamined Patent Application Publication No. 2016-081185, the same situation is established as when a new axis is provided between requirements to which axes have already been assigned. In this process, a cumbersome operation such as redefinition of an axis set for each requirement needs to be performed.

Although a development process has been taken as an example, any type of process may be used insofar as a result is obtained through steps. A designing process, a requirement defining process, a study process, or a production process, for example, may be used insofar as a process and a procedure of the process to be performed are determined.

The following exemplary embodiment provides a system capable of using an already created relations diagram and efficiently creating a relations diagram for a new process.

An exemplary embodiment of the present invention will be described hereinafter on the basis of the drawings.

FIG. 1 is a conceptual diagram illustrating the configuration of modules according to the present exemplary embodiment.

Modules generally refer to logically separable software (computer program) or hardware components. The modules in the present exemplary embodiment therefore include not only modules of computer programs but also modules of hardware components. The present exemplary embodiment also applies to computer programs (a program for causing a computer to perform steps, a program for causing the computer to function as units, and a program for causing the computer to achieve functions), a system, and a method for achieving these modules. Although terms "store" and "stored" and other equivalent terms will be used for convenience of description, these terms mean that, when the exemplary embodiment implements the present invention as computer programs, the computer programs are stored in a storage device or the storage device is controlled in such a way as to store the computer programs. The modules may be in one-to-one correspondence with functions, but in practice, one module may be achieved by one program, plural modules may be achieved by one program, or one module may be achieved by plural programs. Plural modules may be executed by one computer, or one module may be executed by plural computers in distributed or parallel computing. One module may include another module. In the following description, a term "connection" will be used not only for a physical connection but also for a logical connection (communication of data, issuance of instructions, reference relationships of data, etc.). A term "predetermined" means that something is determined prior to processing in question, and may be used whenever something is determined prior to processing in question depending on a situation or a state at the time or a situation or a state so far regardless of whether something is determined before a process according to the present exemplary starts or during the process. When there are plural predetermined values, the values may be different from one another or two or more values (or all values, obviously) may be the same. A sentence "If something is A, B is performed" means that it is determined whether something is A, and if so, B is performed. This, however, excludes a case where the determination whether something is A need not be made. In addition, when items are enumerated like "A, B, and C", these items are enumerated as examples unless otherwise specified, and a case is possible where only one of them (e.g., only A) is selected.

A system or an apparatus may be achieved by plural computers, plural pieces of hardware, plural apparatuses, or the like connected to one another through a communication medium such as a network (includes a one-to-one connection) or may be achieved by a single computer, a single piece of hardware, a single apparatus, or the like. Terms "apparatus" and "system" will be used as synonyms. Needless to say, the term "system" does not imply a social mechanism (social system), which is based on a human agreement.

Target information is read from a storage device before a process or each of plural process performed by a module, and a result of the process is written to the storage device after the process is completed. Description of the reading of information before a process and the writing of a result to the storage device after a process might be omitted. The storage device may be a hard disk, a random-access memory (RAM), an external storage medium, a storage device through a communication line, a register of a central processing unit (CPU), or the like.

An information processing apparatus 100 according to the present exemplary embodiment edits relations diagrams and deployment tables and, as illustrated in the example illustrated in FIG. 1, includes a relations diagram and deployment table creation module 105, a relations diagram and deployment table storage module 125, and an edit module 145.

Figure 5:
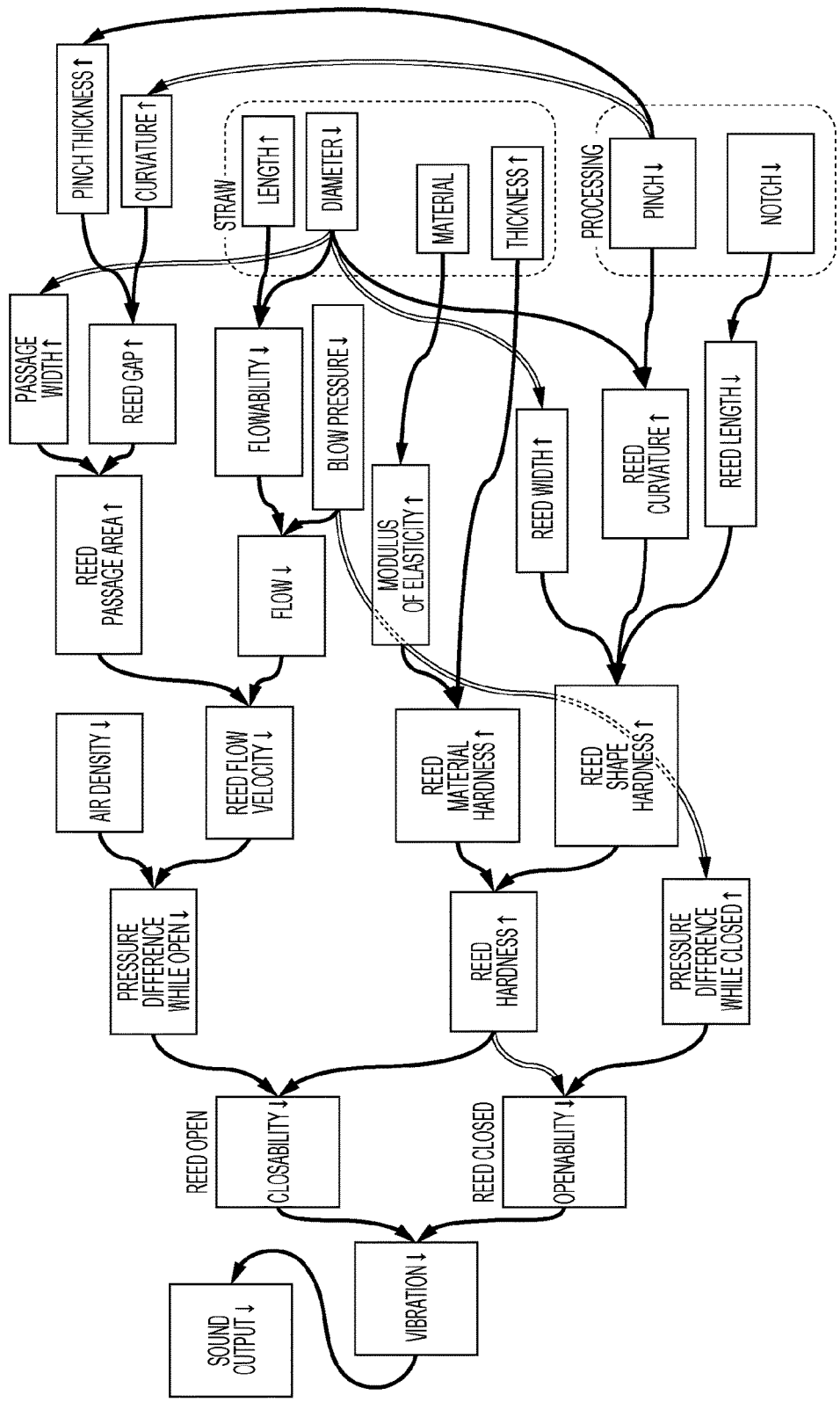
FIG. 5 is a diagram illustrating an example of a relations diagram.

A relations diagram is used to clarify cause-and-effect relationships when a problem to be addressed has been identified but causes of the problem are complex. As illustrated in FIG. 5, a relations diagram includes items and arrows. The items correspond to nodes (vertices) in a graph theory. The arrows correspond to edges (branches) in the graph theory.

Definitions of terms will be described.

A "system" is a mechanism in which plural elements are configured to together achieve a certain operation while interacting with one another. Any system is a subsystem of a larger system.

A "customer" is a person or an organization who receives a value of a provided system and who pays for the system. A step after development or production is also a customer.

A "quality" refers to a property subjected to evaluation for determining a satisfaction level of a customer toward a service.

An "indicator" is information used to determine or evaluate a target.

A "factor" is an entity that can affect (contribute to) an event. The term is often used in a statistical field such as quality engineering.

A "primary factor" is a factor that affects an event so greatly that it is difficult to ignore.

A "cause" is a factor that has actually caused (causes) an event.

A "property" is an adjective indicating an intrinsic state of a target (e.g., "hard", "thin", or "beautiful"). "Intrinsic" means that a property in question is originally intended or innate, not accidental.

A "behavior" is a verb indicating a change in a state of a target (e.g., "move", "charge", or "conduct"). In many cases, a behavior is accompanied by an adverb indicating a degree of the change (e.g., "fast", "strongly", or "much").

An "action" is a noun indicating an effect of a target upon another thing or an effect received from another thing or an adverb indicating a degree of the effect (e.g., heating, thermal storage, pressure, or oxidation).

A "characteristic" is an indicator of a property, a behavior, or an action.

A "function" is a property, a behavior, or an action that is a unique role of each component of a system. A function is something that manifests, and something that exists or does not exist. In quality engineering, an "objective function" refers to an operation for achieving an object of a system, and a "generic function" refers to an operation for technically supporting the achievement of an objective function.

"Performance" is a quantitative indicator of a function. That is, performance is a quantitative indicator indicating a degree of a property, a behavior, or an action. Performance is something achieved, and can be high or low.

The relations diagram and deployment table creation module 105 includes a relations diagram creation module 110, a deployment table generation module 115, and an output module 120 and is connected to the relations diagram and deployment table storage module 125. The relations diagram and deployment table creation module 105 creates a relations diagram, generates a deployment table from the relations diagram, and outputs the relations diagram and the deployment table. The technique disclosed in Japanese Unexamined Patent Application Publication No. 2016-081185, for example, may be used.

The relations diagram creation module 110 is connected to the deployment table generation module 115. The relations diagram creation module 110 receives information necessary to create a relations diagram. For example, the relations diagram creation module 110 receives information such as a name of a relations diagram, items, details of the items (attribute information regarding the items), and arrows (dependence between the items (dependence information and attribute information regarding the arrows)) created as a result of operations performed, using keys and a mouse, by a user on a user interface displayed on a display device such as a liquid crystal display. The relations diagram creation module 110 can also read information stored in a hard disk (a built-in hard disk of the computer or a one connected through the network) or the like.

For example, the relations diagram creation module 110 receives plural factors, attribute information regarding the factors including processes to which the factors belong, and cause-and-effect relationships between the plural factors and creates or edits a relations diagram.

The deployment table generation module 115 is connected to the relations diagram creation module 110, the output module 120, and a relations diagram edit module 165 of the edit module 145. The deployment table generation module 115 generates a deployment table on the basis of a relations diagram created by the relations diagram creation module 110.

If a display module 160 corrects a displayed relations diagram, the deployment table generation module 115 may generate a deployment table from the corrected relations diagram. That is, the deployment table generation module 115 may generate a deployment table on the basis of a relations diagram edited by the relations diagram edit module 165, instead of a relations diagram created by the relations diagram creation module 110. In this generation process, the deployment table generation module 115 generates a relations diagram identifier (ID) and deployment table ID association table 1500, an item ID and axis item ID association table 1600, and an arrow ID and cause-and-effect information ID association table 1700.

The output module 120 is connected to the deployment table generation module 115. The output module 120 outputs a relations diagram created by the relations diagram creation module 110 (can be a relations diagram edited by the relations diagram edit module 165) and a deployment table generated by the deployment table generation module 115 (can be a deployment table generated on the basis of the relations diagram created by the relations diagram creation module 110 or a deployment table generated on the basis of the relations diagram edited by the relations diagram edit module 165). When the relations diagram and the deployment table are output, for example, the relations diagram and the deployment table are displayed on a display device such as a display, printed by a printing device such as a printer, transmitted by an image transmission device such as a facsimile, written to a storage device such as a database, stored in a storage medium such as a memory card, or transferred to another information processing apparatus.

The relations diagram and deployment table storage module 125 includes a relations diagram storage module 130, a deployment table storage module 135, a relations diagram and deployment table association storage module 140 and is connected to the relations diagram and deployment table creation module 105 and the edit module 145. The relations diagram and deployment table storage module 125 stores information regarding relations diagrams and deployment tables.

The relations diagram storage module 130 stores information regarding relations diagrams. More specifically, for example, the relations diagram storage module 130 stores a relations diagram information table 900, an item information table 1000, and an arrow information table 1100. FIG. 9 is a diagram illustrating an example of the data structure of the relations diagram information table 900. The relations diagram information table 900 includes a relations diagram ID field 905, a relations diagram name field 910, a user field 915, a time field 920, a number of items field 925, item ID fields 930, a number of arrows field 935, and arrow ID fields 940. In the present exemplary embodiment, the relations diagram ID field 905 stores information for uniquely identifying a relations diagram (relations diagram ID). The relations diagram name field 910 stores a name of the relations diagram having the relations ID. The user field 915 stores a user who has created the relations diagram. The time field 920 stores a time point at which the relations diagram has been created (year, month, day, hour, minute, second, decimal, or a combination thereof). The number of items field 925 stores the number of items of the relations diagram. There are as many item ID fields 930 as the number of items indicated in the number of items field 925. In the present exemplary embodiment, the item ID fields 930 store information (item IDs) for uniquely identifying items. The information indicated in the item ID fields 930 is stored in the item information table 1000. The number of arrows field 935 stores the number of arrows of the relations diagram. There are as many arrow ID fields 940 as the number of arrows indicated in the number of arrows field 935. In the present exemplary embodiment, the arrow ID fields 940 store information (arrow IDs) for uniquely identifying arrows. In the present exemplary embodiment, the information indicated in the arrow ID fields 940 is stored in the arrow information table 1100.

FIG. 10 is a diagram illustrating an example of the data structure of the item information table 1000. The item information table 1000 includes an item ID field 1005, a details of item field 1010, a number of effect items field 1015, and effect item ID fields 1020. The item ID field 1005 stores an item ID. The details of item field 1010 stores details (an item name and the like) of an item having the item ID. The number of effect items field 1015 stores the number of items to which the item is connected to. There are as many effect item ID fields 1020 as the number of items indicated in the number of effect items field 1015. The effect item ID fields 1020 store effect item IDs.

FIG. 11 is a diagram illustrating an example of the data structure of the arrow information table 1100. The arrow information table 1100 includes an arrow ID field 1105, a cause item ID field 1110, an effect item ID field 1115, and an attribute field 1120. The arrow ID field 1105 stores an arrow ID. The cause item ID field 1110 stores an item ID of an item from which an arrow extends. The effect item ID field 1115 stores an item ID of an item to which the arrow extends. The attribute field 1120 stores an attribute of the arrow. The attribute can be, for example, a relationship between items connected to each other by the arrow (a relationship in which a value of an effect item increases as a value of a cause item increases (e.g., direct proportion) or a relationship in which a value of an effect item decreases as a value of a cause item increases (e.g., inverse proportion)) or the like.

FIGS. 9 to 11 illustrate examples, and other types of data structure may be used, instead. For example, the data structure of a graph may be used.

The deployment table storage module 135 stores information regarding a deployment table. More specifically, for example, the deployment table storage module 135 stores a deployment table information table 1200, an axis item information table 1300, and a cause-and-effect information table 1400. FIG. 12 is a diagram illustrating an example of the data structure of the deployment table information table 1200. The deployment table information table 1200 includes a deployment table ID field 1205, a deployment table name field 1210, a user field 1215, a time field 1220, a base relations diagram ID field 1225, an axis A name field 1230, a number of axis items field 1235, axis item ID fields 1240, a number of pieces of cause-and-effect information field 1245, and cause-and-effect information ID fields 1250. In the present exemplary embodiment, the deployment table ID field 1205 stores information (deployment table ID) for uniquely identifying a deployment table. The deployment table name field 1210 stores a name of the deployment table having the deployment table ID. The user field 1215 stores a user who has created the deployment table. The time field 1220 stores a time point at which the deployment table has been created. The base relations diagram ID field 1225 stores a relations diagram ID of a relations diagram from which the deployment table has been generated. That is, the base relations diagram ID field 1225 indicates a relations diagram ID of a relations diagram that has been referred to in order to generate the deployment table. The axis A name field 1230 stores an axis A name. For example, the axis A name is a name (quality) of a first axis (quality) 810A illustrated in FIG. 8. The number of axis items field 1235 to the cause-and-effect information ID fields 1250 are provided for the axis A. When there are four axes, the number of axis items field 1235 to the cause-and-effect information ID fields 1250 are also provided for axes B, C, and D. The number of axis items field 1235 stores the number of items of the axis (axis A). There are as many axis item ID fields 1240 as the number of items indicated in the number of axis items field 1235. In the present exemplary embodiment, the axis item ID fields 1240 store information (axis item IDs) for uniquely identifying the axis items. The information indicated in the axis item ID fields 1240 is stored in the axis item information table 1300. The number of pieces of cause-and-effect information field 1245 stores the number of pieces of cause-and-effect information. The cause-and-effect information corresponds to fields (cells) indicated in an example illustrated in FIG. 8 in which "S", "W", and "−" are written. There are as many cause-and-effect information ID fields 1250 as the number of pieces of cause-and-effect information indicated in the number of pieces of cause-and-effect information field 1245. In the present exemplary embodiment, the cause-and-effect information ID fields 1250 store information (cause-and-effect information IDs) for uniquely identifying the pieces of cause-and-effect information. The information indicated in the cause-and-effect information ID fields 1250 is stored in the cause-and-effect information table 1400.

FIG. 13 is a diagram illustrating an example of the data structure of the axis item information table 1300. The axis item information table 1300 includes an axis item ID field 1305, an axis item name field 1310, and an axis field 1315. The axis item ID field 1305 stores an axis item ID. The axis item name field 1310 stores a name of an axis item having the axis item ID. For example, the axis item name field 1310 stores a name (sound stability) of an axis item (sound stability) 810 illustrated in FIG. 8. The axis field 1315 stores an axis to which the axis item belongs.

FIG. 14 is a diagram illustrating an example of the data structure of the cause-and-effect information table 1400. The cause-and-effect information table 1400 includes a cause-and-effect information ID field 1405, an axis item ID (A) field 1410, an axis item ID (B) field 1415, and an attribute field 1420. The cause-and-effect information ID field 1405 stores a cause-and-effect information ID. The axis item ID (A) field 1410 stores an axis item ID (A). The axis item ID (B) field 1415 stores an axis item ID (B). That is, a position at which the axis item ID (A) field 1410 and the attribute field 1420 intersects is a position of the cause-and-effect information in the deployment table. The attribute field 1420 stores an attribute. For example, the attribute is information such as "S$^+$", "S$^-$", "W$^+$", "W$^-$", or "−".

The relations diagram and deployment table association storage module 140 associates a deployment table and a relations diagram with each other. The relations diagram and deployment table association storage module 140 stores, for example, information for associating a deployment table and a relations diagram with each other. More specifically, for example, FIG. 15 is a diagram illustrating an example of the data structure of the relations diagram ID and deployment table ID association table 1500. The relations diagram ID and deployment table ID association table 1500 includes a relations diagram ID field 1505 and a deployment table ID field 1510. The relations diagram ID field 1505 stores a relation diagram ID. The deployment table ID field 1510 stores a deployment table ID corresponding to the relations diagram ID. More specifically, after the deployment table generation module 115 generates a deployment table from a relations diagram, the relations diagram ID and deployment table ID association table 1500 is generated. A value of the relations diagram ID field is a relation diagram ID indicating the relations diagram from which the deployment table has been generated, and a value of the deployment table ID field 1510 is a deployment table ID indicating the generated deployment table. One relations diagram may correspond to plural deployment tables. This is because plural deployment table can be generated by selecting different items of a relations diagram as axis items.

The relations diagram and deployment table association storage module 140 associates an axis item, which is an item included in an axis of a deployment table and an item of a relations diagram with each other. The relations diagram and deployment table association storage module 140 stores, for example, information for associating an axis item, which is an item included in an axis of a deployment table, and an item of a relations diagram with each other. More specifically, for example, FIG. 16 is a diagram illustrating an example of the data structure of the item ID and axis item ID association table 1600. The item ID and axis item ID association table 1600 includes an item ID field 1605 and an axis item ID field 1610. The item ID field 1605 stores an item ID. The axis item ID field 1610 stores an axis item ID. More specifically, after the deployment table generation module 115 generates a deployment table from a relations diagram, the item ID and axis item ID association table 1600 is generated. A value of the item ID field 1605 is an item ID indicating an item of a relations diagram from which the deployment table has been generated, and a value of the axis item ID field 1610 is an axis item ID indicating an axis item of the generated deployment table.

The relations diagram and deployment table association storage module 140 associates cause-and-effect information indicating a cause-and-effect relationship between two axis items of adjacent axes of a deployment table and an arrow connecting items to each other in a relations diagram with each other. The "two axis items of adjacent axes" refer to, when axes A and B are adjacent to each other, an axis item A1 of the axis A and an axis item B1 of the axis B. The relations diagram and deployment table association storage module 140 stores, for example, information for associating cause-and-effect information indicating a cause-and-effect relationship between two axis items of adjacent axes of a deployment table and an arrow connecting items to each other in a relations diagram with each other. More specifically, FIG. 17 is a diagram illustrating an example of the data structure of the arrow ID and cause-and-effect information association table 1700. The arrow ID and cause-and-effect information association table 1700 includes an arrow ID field 1705 and a cause-and-effect information ID field 1710. The arrow ID field 1705 stores an arrow ID. The cause-and-effect information ID field 1710 stores a cause-and-effect information ID. More specifically, after the deployment table generation module 115 generates a deployment table from a relations diagram, the arrow ID and cause-and-effect information association table 1700 is generated. A value of the arrow ID field 1705 is an arrow ID indicating an arrow in the relations diagram from which the deployment table has been generated, and a value of the cause-and-effect information ID field 1710 is a cause-and-effect information ID indicating cause-and-effect information regarding the generated deployment table. One cause-and-effect information ID may correspond to plural arrow IDs. This is because one or more items (items that have not been selected as axis items) can be generated between items depending on how axis items have been selected. More specifically, this is because if items A and C have been selected as axis items but there is an item B between the items A and C (more specifically, if there is no arrow directly connecting the items A and C to each other but there is an arrow connecting the item A to the item B and an arrow connecting the item B to the item C), there is only one piece of cause-and-effect information between axis items A and C in the deployment table but the piece of cause-and-effect information corresponds to the two arrows (the arrow connecting the item A to the item B and the arrow connecting the item B to the item C) in a corresponding relations diagram.

The edit module 145 includes a deployment table operation reception module 150, a related information extraction module 155, a display module 160, and a relations diagram edit module 165 and is connected to the relations diagram and deployment table storage module 125. The edit module 145 edits a deployment table and also edits a relations diagram in accordance with the edited deployment table. After a request to edit a deployment table generated by the deployment table generation module 115 is issued, for example, the edit module 145 extracts a relations diagram corresponding to the deployment table to edit the relations diagram. The edit module 145 generates the deployment table again for the deployment table generation module 115 on the basis of a result of the editing. As a result, the deployment table reflects the result of the editing, and information regarding the relations diagram and the deployment table remains the same.

The deployment table operation reception module 150 is connected to the related information extraction module 155. The deployment table operation reception module 150 receives information regarding editing performed by the user on a deployment table through keys of a keyboard or a mouse. The deployment table operation reception module 150 also reads edit information created in advance stored in a hard disk or the like. For example, the deployment table operation reception module 150 integrates plural axis items of an axis of a deployment table together.

The related information extraction module 155 is connected to the deployment table operation reception module 150, the display module 160, and the relations diagram edit module 165. The related information extraction module 155 extracts a relations diagram from a deployment table, items of the relations diagram from an axis item of the deployment table, and arrows of the relations diagram from cause-and-effect information regarding the deployment table using the relations diagram ID and deployment table ID association table 1500, the item ID and axis item ID association table 1600, and the arrow ID and cause-and-effect information association table 1700 stored in the relations diagram and deployment table association storage module 140. That is, the related information extraction module 155 extracts a relations diagram, items of the relations diagram, and arrows of the relations diagram from a deployment table, an axis item of the deployment table, and cause-and-effect information regarding the deployment table, respectively, that are editing targets of the deployment table operation reception module 150.

If a third axis is inserted between first and second axes adjacent to each other in a deployment table, the related information extraction module 155 may extract a relations diagram associated with the deployment table. For example, the related information extraction module 155 may extract a relations diagram from a deployment table that is an editing target using the relations diagram and deployment table ID association table 1500.

The display module 160 is connected to the related information extraction module 155 and the relations diagram edit module 165. The display module 160 displays a relations diagram associated with a deployment table that is a correction target using at least one of the relations diagram ID and deployment table ID association table 1500, the item ID and axis item ID association table 1600, and the arrow ID and cause-and-effect information association table 1700. When a relations diagram is extracted from a deployment table, for example, the relations diagram ID and deployment table ID association table 1500 is used. When items of a relations diagram are extracted from an axis item of a deployment table, the relations diagram ID and deployment table ID association table 1500 and the item ID and axis item ID association table 1600 are used. When arrows of a relations diagram are extracted from cause-and-effect information regarding a deployment table, the relations diagram ID and deployment table ID association table 1500 and the arrow ID and cause-and-effect information association table 1700 are used. When items and arrows of a relations diagram are extracted from an axis item of a deployment table and cause-and-effect information regarding the deployment table, respectively, the relations diagram ID and deployment table ID association table 1500, the item ID and axis item ID association table 1600, and the arrow ID and cause-and-effect information association table 1700 are used. The above expression "a deployment table that is a correction target" means that the deployment table has already been corrected or the correction has not been performed yet. That is, a relations diagram may be displayed after the correction is completed or after a deployment table is selected as a correction target.

The display module 160 may display a relations diagram associated with a deployment table that is a correction target using the relations diagram ID and deployment table ID association table 1500. The display module 160 may display items associated with an axis item that is a correction target using the item ID and axis item ID association table 1600 in a mode different from one for other items. For example, a relations diagram ID of a relations diagram can be extracted from a deployment table ID of a deployment table using the relations diagram ID and deployment table ID association table 1500. Item IDs of the relations diagram can then be extracted from an axis item ID of an axis item of the deployment table using the item ID and axis item ID association table 1600. Here, the "mode" refers to a shape (e.g., a shape of frames surrounding items, such as an ellipse or a rectangle), a pattern (e.g., a background hatching), a color (e.g., a color of frames surrounding items, a color of a background, a color of text indicating items, or the like), a combination thereof, or a dynamic change thereof (e.g., a flash, an animation, or the like). The "other items" refer to items associated with axis items that are not correction targets. It is sufficient that the mode is different from one for the other items.

If plural axis items of an axis of a deployment table are integrated together, the display module 160 may display items of a relations diagram associated with the plural axis items while integrating the items together.

Furthermore, if cause-and-effect information is different between plural axis items to be integrated together and axis items of adjacent axes are different from each other, the display module 160 may display a message indicating that there is an inconsistency.

In addition, the display module 160 may display a relations diagram associated with a deployment table that is a correction target using the relations diagram ID and deployment table ID association table 1500. The display module 160 may display arrows associated with cause-and-effect information that is a correction target in a mode different from one for other arrows using the arrow ID and cause-and-effect information association table 1700.

If plural axis items of an axis of a deployment table are integrated together, the display module 160 may display arrows of a relations diagram associated with cause-and-effect information regarding the axis items while integrating the arrows together.

Furthermore, if attribute information is different between plural arrows to be integrated together in a relations diagram, the display module 160 may display a message indicating that there is an inconsistency.

The display module 160 may also display a message for prompting the user to correct items or arrows displayed in a different mode.

If items other than items displayed in a different mode or arrows other than arrows displayed in a different mode are selected as correction targets, the display module 160 may display a message indicating that the items or the arrows that are not correction targets in a deployment table will be corrected.

The relations diagram edit module 165 is connected to the related information extraction module 155, the display module 160, and the deployment table generation module 115 of the relations diagram and deployment table creation module 105. The relations diagram edit module 165 edits a relations diagram displayed by the display module 160 in accordance with an editing operation performed by the user on the relations diagram. For example, the relations diagram edit module 165 edits, in accordance with an editing operation performed by the user, attribute information regarding arrows for which the display module 160 has displayed a message indicating that there is an inconsistency. The relations diagram edit module 165 also edits, in accordance with editing operations performed by the user, items (includes addition and deletion), attributes of the items, arrows (includes addition and deletion), attributes of the arrows, and the like.

The relations diagram edit module 165 may also correct a relations diagram corresponding to a deployment table corrected by the deployment table operation reception module 150. If the user performs an operation for editing a displayed deployment table, for example, the relations diagram edit module 165 edits the deployment table on the basis of the operation and causes a relations diagram corresponding to the deployment table to reflect a result of the editing. As a result, information regarding the relations diagram and the deployment table remains the same even when the user does not use the relations diagram. Details of the process will be described later with reference to FIGS. 21A to 27.

The relations diagram edit module 165 may insert, in a relations diagram extracted by the related information extraction module 155, a third item relating to an axis item of a third axis between a first item relating to an axis item of a first axis and a second item relating to an axis item of a second axis. A relationship between the axis items of the deployment table and the items of the relations diagram, namely the third item relating to the axis item of the third axis, the first item relating to the axis item of the first axis, and the second item relating to the axis item of the second axis, may be extracted using the related information extraction module 155 or the relations diagram and deployment table association storage module 140 of the relations diagram and deployment table storage module 125.

If there is one or more items between the first and second items in a relations diagram, the relations diagram edit module 165 may insert the third item as a temporary item (hereinafter referred to as a "dummy item").

In addition, the relations diagram edit module 165 may insert the third item immediately before the second item or immediately after the first item.

In addition, the relations diagram edit module 165 may insert the third item in a manner that allows the user to correct the third item.

In addition, the relations diagram edit module 165 may perform control such that the third item is not inserted at a position other than between the first and second items.

If there is no item between the first and second items in a relations diagram, the relations diagram edit module 165 may insert the third item.

The relations diagram edit module 165 may allow the user to correct the third item and, if the user has corrected the third item, correct an axis item of the third axis of a deployment table associated with the third item.

Figure 2:
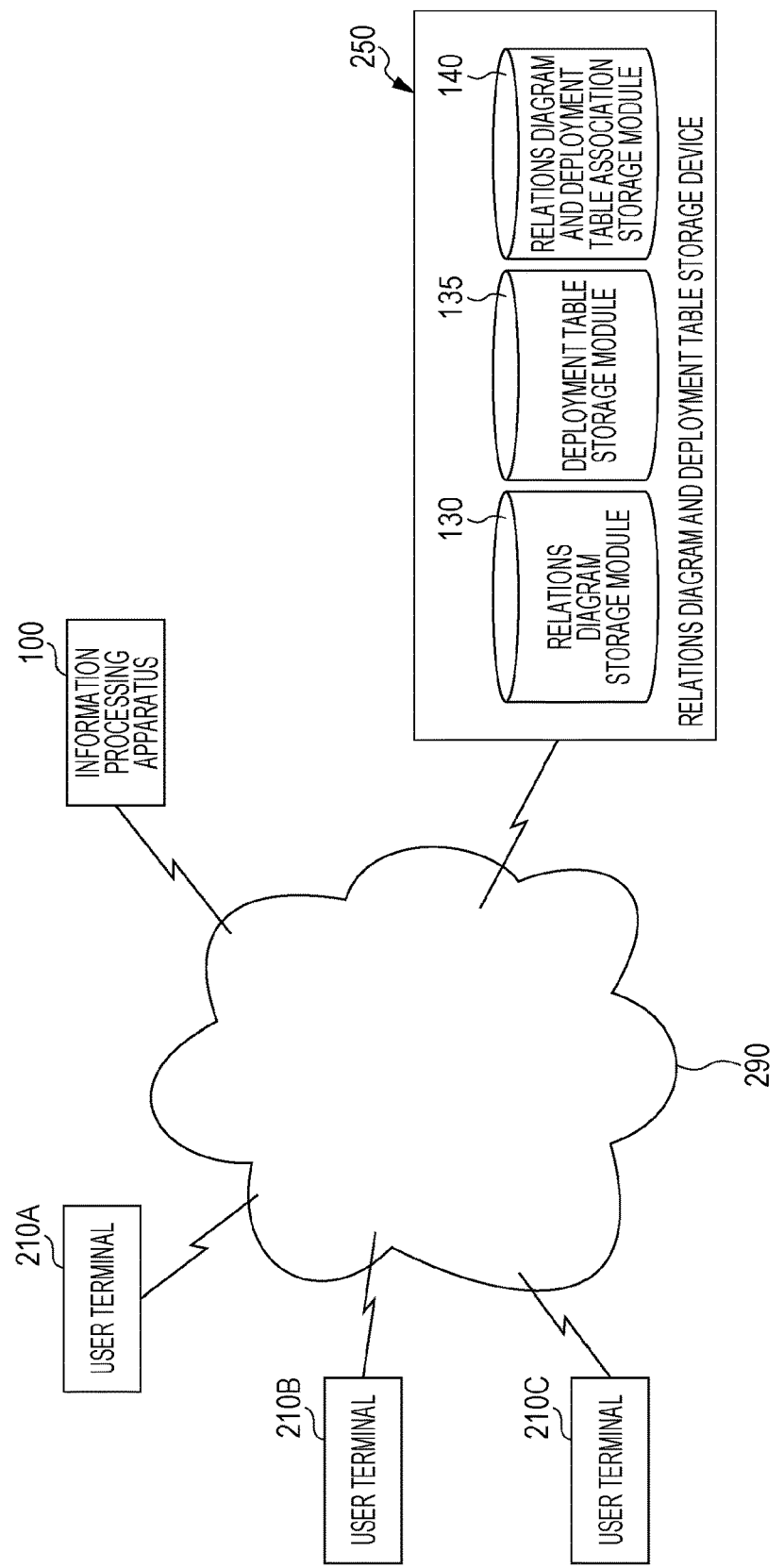
FIG. 2 is a diagram illustrating an example of a system configuration according to the exemplary embodiment.

FIG. 2 is a diagram illustrating an example of a system configuration according to the present exemplary embodiment.

An information processing apparatus 100, a user terminal 210A, a user terminal 210B, a user terminal 210C, and a relations diagram and deployment table storage device 250 are connected to one another through a communication line 290. The communication line 290 may be a wireless or wired line or a combination of wireless and wired lines, and may be, for example, the Internet or an intranet as a communication infrastructure. Functions of the information processing apparatus 100 and the relations diagram and deployment table storage device 250 may be achieved as a cloud service. The relations diagram and deployment table storage device 250 includes the relations diagram storage module 130, the deployment table storage module 135, and the relations diagram and deployment table association storage module 140. The information processing apparatus 100 may use the relations diagram storage module 130, the deployment table storage module 135, and the relations diagram and deployment table association storage module 140 included in the relations diagram and deployment table storage device 250 through the communication line 290 as the relations diagram storage module 130, the deployment table storage module 135, and the relations diagram and deployment table association storage module 140.

The information processing apparatus 100 creates a relations diagram in accordance with an operation performed by a user using the user terminal 210A, for example, and a deployment table is generated on the basis of the relations diagram. The technique disclosed in Japanese Unexamined Patent Application Publication No. 2016-081185, for example, may be used. Relations diagram information is stored in the relations diagram storage module 130 of the relations diagram and deployment table storage device 250 through the communication line 290, and deployment table information is stored in the deployment table storage module 135 of the relations diagram and deployment table storage device 250 through the communication line 290.

A user of the user terminal 210B mainly uses a deployment table, for example, and edits the deployment table. More specifically, there is an editing instruction to insert a new axis between axes. After the deployment table is edited, the information processing apparatus 100 displays a relations diagram associated with the deployment table and emphasizes items or arrows of the relations diagram associated with an axis item or cause-and-effect information that is an editing target. In particular, an item corresponding to an axis item of the new axis inserted into the deployment table is displayed in the relations diagram. The user then checks and, as necessary, edits the relations diagram.

The user terminals 210 may include the information processing apparatus 100. In this case, a standalone system is established.

Figure 3:
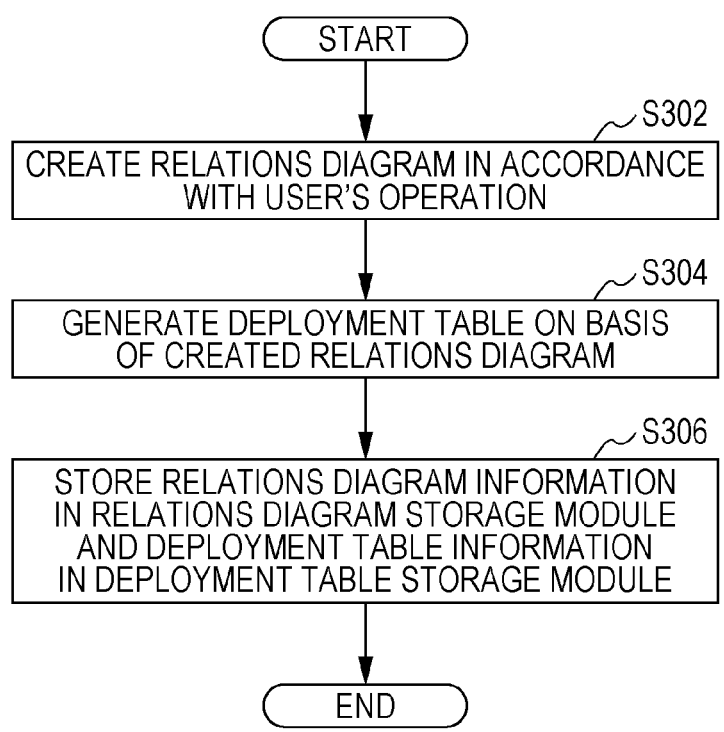
FIG. 3 is a flowchart illustrating an example of a process according to the exemplary embodiment.

FIG. 3 is a flowchart illustrating an example of a process according to the present exemplary embodiment (relations diagram and deployment table creation module 105).

In step S302, the relations diagram creation module 110 creates a relations diagram in accordance with an operation performed by the user.

In step S304, the deployment table generation module 115 generates a deployment table on the basis of the created relations diagram.

In step S306, the output module 120 stores relations diagram information in the relations diagram storage module 130 and deployment table information in the deployment table storage module 135.

Next, an example will be described with reference to FIGS. 4 to 8 in which a relations diagram is created for a mechanism of a straw whistle and a deployment table is generated.

Figure 4:
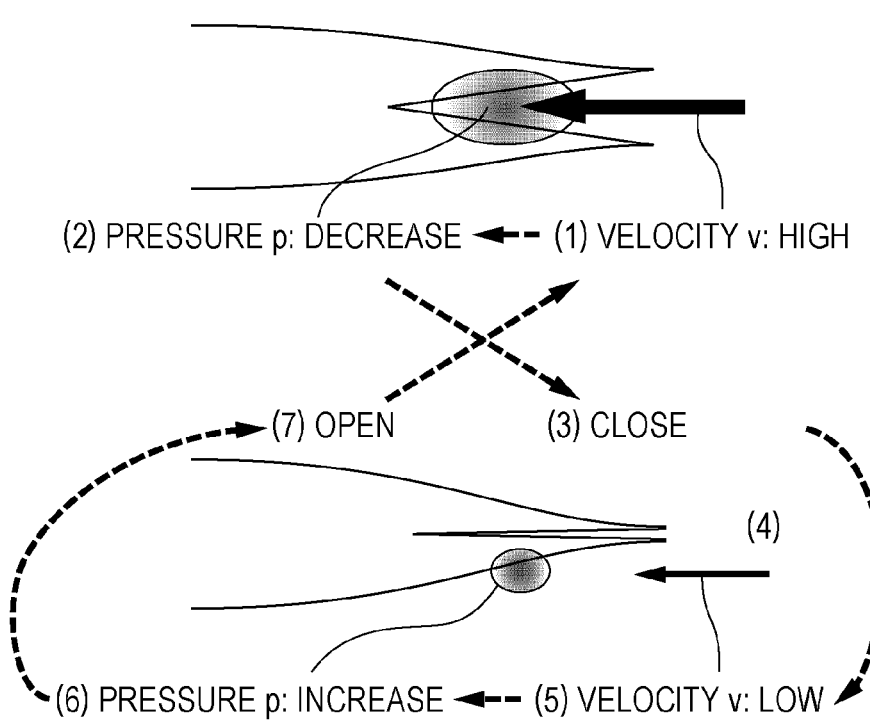
FIG. 4 is a diagram illustrating an example of a technique for which a relations diagram and a deployment table are created.

FIG. 4 is a diagram illustrating an example of a technique (the mechanism of the straw whistle) for which a relations diagram and a deployment table are created.

A principle in fluid dynamics stating that an increase in the speed of a fluid occurs simultaneously with a decrease in pressure, which is Bernoulli's principle (refer to expression (1)), is used for the straw whistle.

$$p + \frac{1}{2}\rho v^2 = \text{constant } (p\text{: pressure, } r\text{: density, } v\text{: velocity}) \quad (1)$$

Vibration of the straw whistle can be explained as follows. Numbers below correspond to numbers indicated in FIG. 4.

(1) A person blows the straw and flow velocity inside the straw increases (2) Pressure decreases (3) Reed closes (4) Passage narrows (5) Flow velocity decreases (6) Pressure increases (7) Reed opens and the process returns to (1) FIG. 5 is a diagram illustrating an example of a relations diagram. FIG. 5 illustrates an example of a relations diagram of a mechanism of a straw whistle that does not emit sound. The relations diagram creation module 110 creates the relations diagram in accordance with an operation performed by the user.

It is assumed here that the density of air does not vary and a way of pinching the straw is not determined.

In the example illustrated in FIG. 5, items defined by rectangles are connected to each other by arrows. Upward arrows inside the item indicate that there are upward changes in the items and downward arrows indicate that there are downward changes in the items.

Colors of the arrows connecting the items to each other indicate the polarity of cause-and-effect relationships. Thick black arrows connecting the items to each other indicate that there are positive correlations, and double lines (white lines) connecting the items to each other indicate that there are negative correlations. If an item "vibration" decreases, for example, an item "sound output" also decreases. Alternatively, levels of effects of cause-and-effect relationships may be indicated by solid lines and broken lines. These pieces of information are stored in the attribute field 1120 of the arrow information table 1100.

Figure 6:
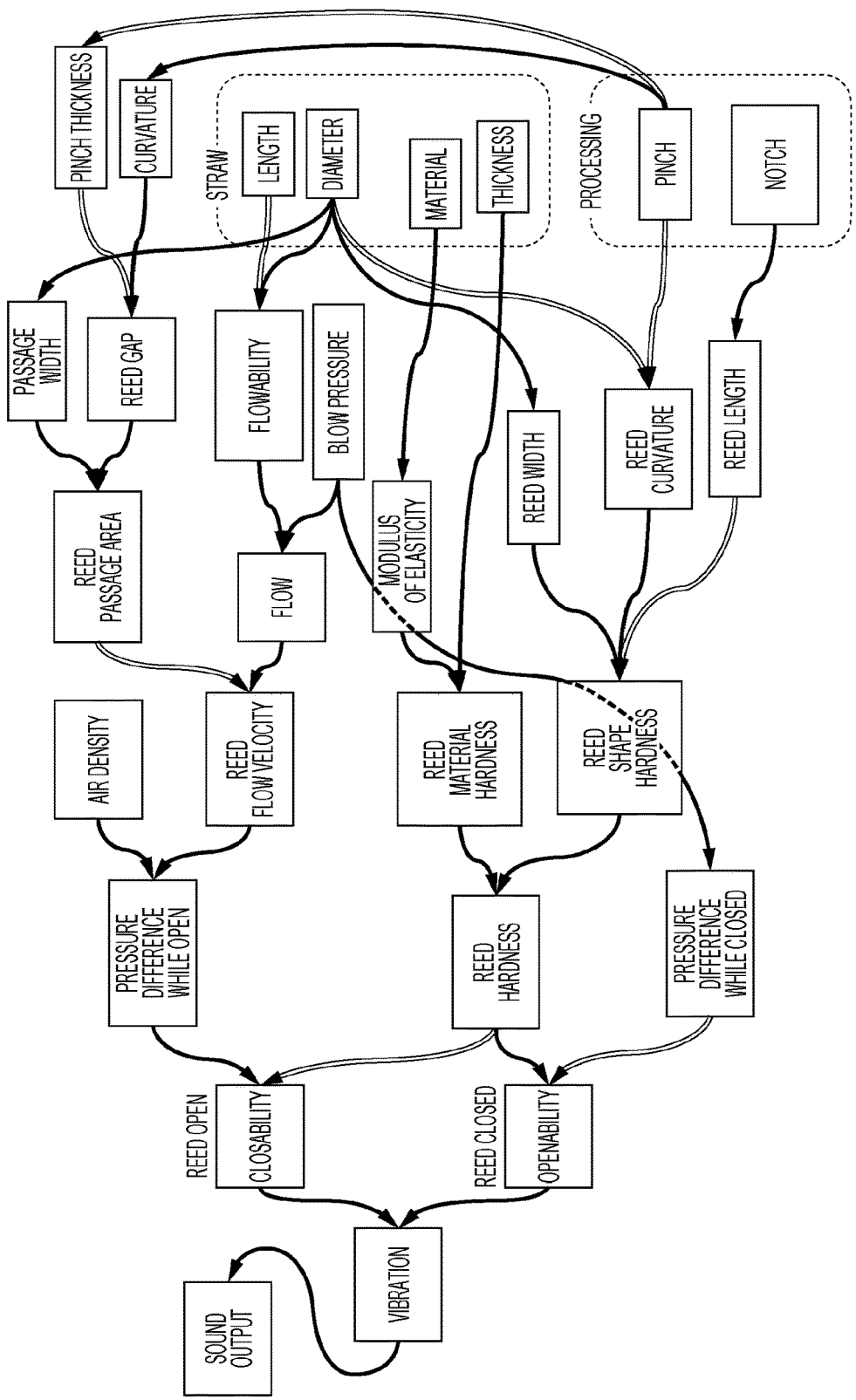
FIG. 6 is a diagram illustrating another example of the relations diagram.

FIG. 6 is a diagram illustrating another example of the relations diagram. The relations diagram illustrated in FIG. 6 is obtained by changing all the items of the relations diagram illustrated in FIG. 5 to upward factors. That is, FIG. 6 illustrates an example of a relations diagram of sound stability. As a result, some positive correlations change to negative correlations and some negative correlations change to positive correlations among the arrows connecting the items to each other.

Figure 7:
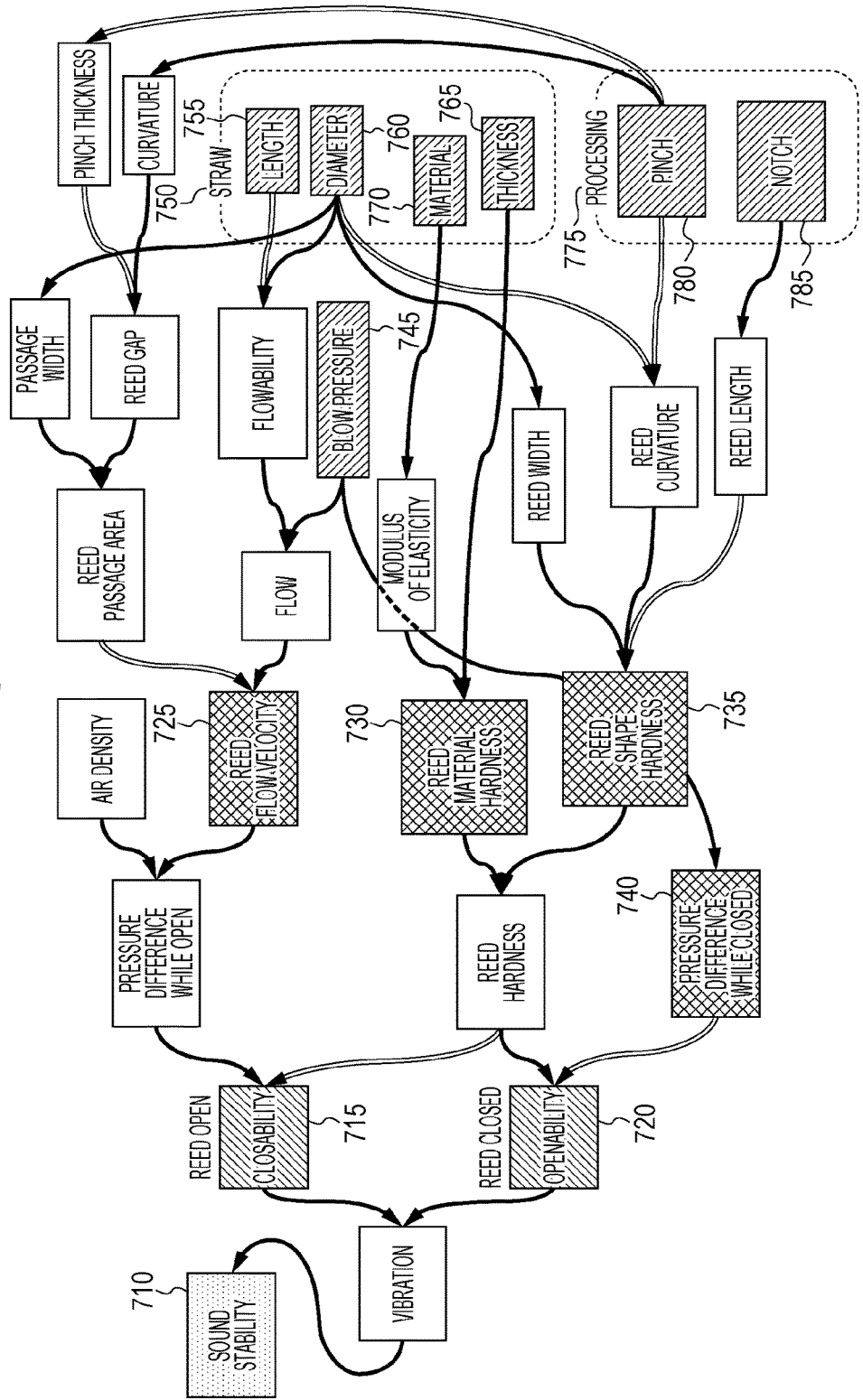
FIG. 7 is a diagram illustrating another example of the relations diagram.

FIG. 7 is a diagram illustrating another example of the relations diagram.

FIG. 7 illustrates an example in which items to be used as axes (axis items) of a deployment table have been selected through an operation performed by the user. Here, a first axis is quality (guaranteed for a customer), a second axis is performance (an indicator of the operation of each component of a system), a third axis is a control physical quantity (a physical quantity to be controlled), and a fourth axis is setting items (items determined by a designer).

An item (sound stability) 710 has been selected as the first axis.

An item (closability) 715 and an item (openability) 720 have been selected as the second axis.

An item (reed flow velocity) 725, an item (reed material hardness) 730, an item (reed shape hardness) 735, and an item (pressure difference while open) 740 have been selected as the third axis.

An item (blow pressure) 745, an item (length) 755, an item (diameter) 760, an item (thickness) 765, an item (material) 770, an item (pinch) 780, and an item (notch) 785 have been selected as the fourth axis.

Figure 8:
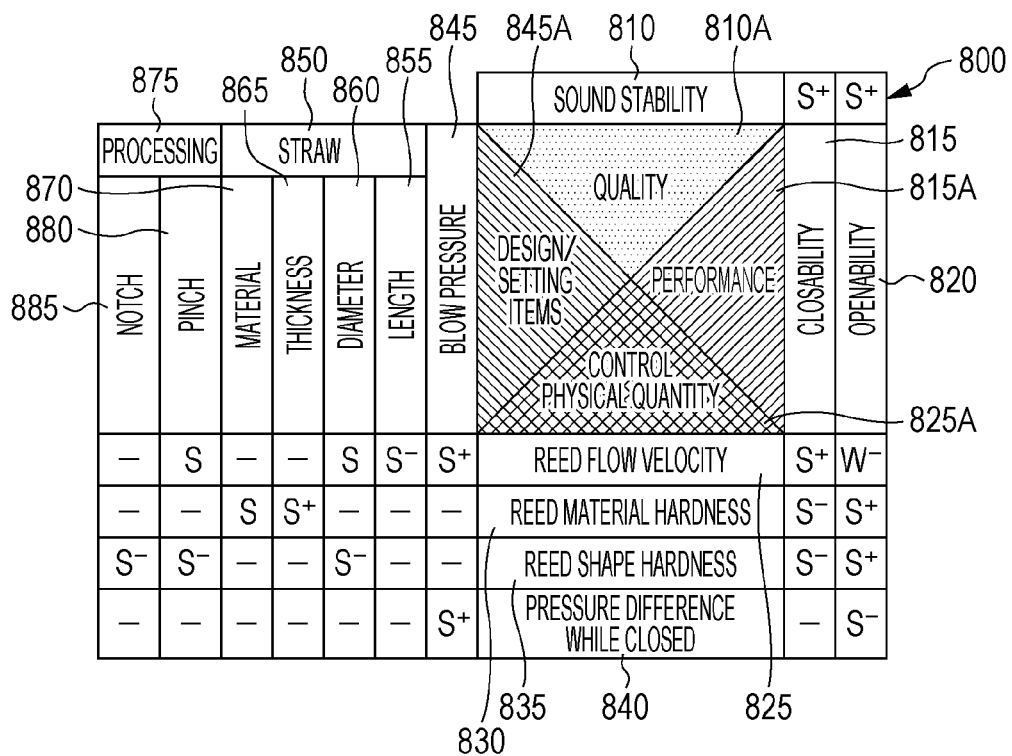
FIG. 8 is a diagram illustrating an example of a deployment table.

FIG. 8 is a diagram illustrating an example of a deployment table. FIG. 8 illustrates a deployment table generated from the relations diagram illustrated in FIG. 7. That is, FIG. 8 illustrates an example of a deployment table of the sound stability of the straw whistle.

A target of a deployment table is the entirety or a part of a system developed or designed to satisfy properties required by a customer (a next step may be included).

The first axis (quality) 810A is a quality (an indicator of a value for a customer), that is, an evaluation indicator of a value (satisfaction level) offered to a customer (next step). The first axis (quality) 810 is an indicator of a value obtained when a system (component) that is a target of a deployment table achieves a function thereof and an evaluation indicator of a value (satisfaction level) offered to a customer (next step) by the system or a higher system. The first axis (quality) 810A includes the axis item (sound stability) 810.

A second axis (performance) 815A is performance (an indicator of a degree of manifestation of a function), that is, an indicator of a degree of manifestation of a unique role (function) achieved by a component or a subsystem of a system in order to produce a quality. The second axis (performance) 815A is also an indicator of a degree of accompanying performance (properties to be achieved) while assuming interactions between subsystems and the entirety of the system as subsystems in a broad sense and including roles (actions) for undesirable phenomena. The second axis (performance) 815A may include noise that does not directly affect performance but that affects a quality. The second axis (performance) 815A includes an axis item (closability) 815 and an axis item (openability) 820.

A third axis (control physical quality) 825A is a control physical quantity (a physical quantity to be controlled), that is, a physical quantity to be controlled or specified in order for a component or a subsystem to achieve performance. Although all the items might not be actually controlled or measured, development or designing should usually be performed in accordance with the physical quantity. If design items are control physical quantities, the same items may be described for the third and fourth axes. The third axis (control physical quantity) 825A includes an axis item (reed fluid velocity) 825, an axis item (reed material hardness) 830, an axis item (reed material shape hardness) 835, and an axis item (pressure difference while closed) 840.

A fourth axis (design/setting items) 845A is setting items (quantities and conditions directly determined by a designer), that is, setting conditions for controlling the control physical quantity of a target component or subsystem and quantities and conditions that can be determined (to be determined) by the designer. The fourth axis (design/setting items) 845A may include noise that affects the control physical quantity. The fourth axis (design/setting items) 845A includes an axis item (blow pressure) 845, an axis item (straw) 850, and an axis item (processing) 875. The axis item (straw) 850 includes an axis item (length) 855, an axis item (diameter) 860, an axis item (thickness) 865, and an axis item (material) 870. The axis item (processing) 875 includes an axis item (pinch) 880 and an axis item (notch) 885.

Cells (rectangles in which "S", "M", "W", and the like are written in the example illustrated in FIG. 8) whose positions are determined in adjacent axis items of a deployment table are cause-and-effect information. The cause-and-effect information indicates a cause-and-effect relationship between two axis items. Signs "S" and "W" indicate a degree of effect of the cause-and-effect relationships, and accompanying signs "+" and "−" indicate the polarity of cause-and-effect relationships. That is, "+" indicates a positive correlation, "−" indicates a negative correlation, "S⁺" indicates a strong positive correlation, "W⁺" indicates a week positive correlation, "S⁻" indicates a strong negative correlation, "W⁻" indicates a week negative correlation, and "−" indicates no correlation. A relationship between the axis item (sound stability) 810 and the axis item (closability) 815, for example, is "W+". These pieces of information are stored in the attribute field 1420 of the cause-and-effect information table 1400. Since the arrow information table 1100 of a relations diagram and the cause-and-effect information table 1400 of a deployment table correspond to each other in the arrow ID and cause-and-effect information association table 1700, these pieces of information correspond to each other.

Since the item information table 1000 of a relations diagram and the axis item information table 1300 of a deployment table correspond to each other in the item ID and axis item ID association table 1600, these pieces of information correspond to each other.

Although a deployment table is generated from a relations diagram, the relations diagram includes, as described in the example of the straw whistle, explanatory items for facilitating thinking because the relations diagram is used to clarify relationships between complex factors in the form of a diagram illustrating cause-and-effect and purpose-and-measure relationships. The deployment table, on the other hand, is used to express cause-and-effect relationships between items defined by a function or performance of each step and does not include explanatory items. When a deployment table is generated from a relations diagram, therefore, only relevant items are extracted, and the extracted items are assigned to appropriate axis items of the deployment table (refer to Japanese Unexamined Patent Application Publication No. 2016-081185).

The number of relations diagram from which a deployment table is generated is not necessarily one, and a deployment table can include plural cause-and-effect relationships. In this case, there are plural relations diagram for the deployment table.

In addition, when a relations diagram is converted into a deployment table, the deployment table is generated using part of data included in the relations diagram. Even if a deployment table is generated from a single relations diagram, therefore, irreversible conversion is performed. For this reason, there are two kinds of data for the same technique, namely the relations diagram and the deployment table, but these two kinds of data need to be consistent with each other in consideration of accumulation of technical resources.

In the present exemplary embodiment, therefore, the consistency between a relations diagram and deployment table is maintained by associating data.

In the present exemplary embodiment, the following processes are performed.

(1) Addition, deletion, and correction of factors in a deployment table converted from a relations diagram and addition, deletion, and correction of cause-and-effect relationships When an item or a cause-and-effect relationship between items is edited in a deployment table, a relations diagram from which the deployment table has been generated is read and displayed on the basis of relations diagram information stored as attribute information accompanying the item or the cause-and-effect relationship between the items. The user is then prompted to edit the relations diagram. A result of the editing is reflected by the deployment table and displayed. Since original data is only the relations diagram, the consistency between the deployment table and the relations diagram is maintained.

In the case of a deployment table without a relations diagram, the deployment table may be directly edited or a relations diagram generated in a simpler manner may be edited. In either way, the consistency is maintained.

In particular, an operation for inserting a new axis between axes in a relations diagram may be received.

(2) A relations diagram including the editing target (item) or the cause-and-effect relationship between the items is displayed, and the editing target or the cause-and-effect relationship between the items is emphasized (e.g., highlighted).

In particular, when an operation for inserting a new axis between axes of the relations diagram has been received, an item inserted into the relations diagram is emphasized.

(3) If there are plural applicable relations diagrams, all the relations diagrams are displayed. This is because the plural relations diagrams might include the same item or the cause-and-effect relationship.

(4) Although the item or the cause-and-effect relationship between the items is associated with information regarding a relations diagram to which the item or the cause-and-effect relationship between the items belongs in order to call the relations diagram, the number of relations diagrams read is not limited to one.

In addition, when plural axis items have been selected, the plural axis items may be edited as the same axis item. For example, the items are merged with each other.

Alternatively, an item and a cause-and-effect relationship relating to the item may be merged with each other.

If inconsistency occurs due to mergence, the user may be notified of the inconsistency and prompted to perform editing (correction).

Figure 18:
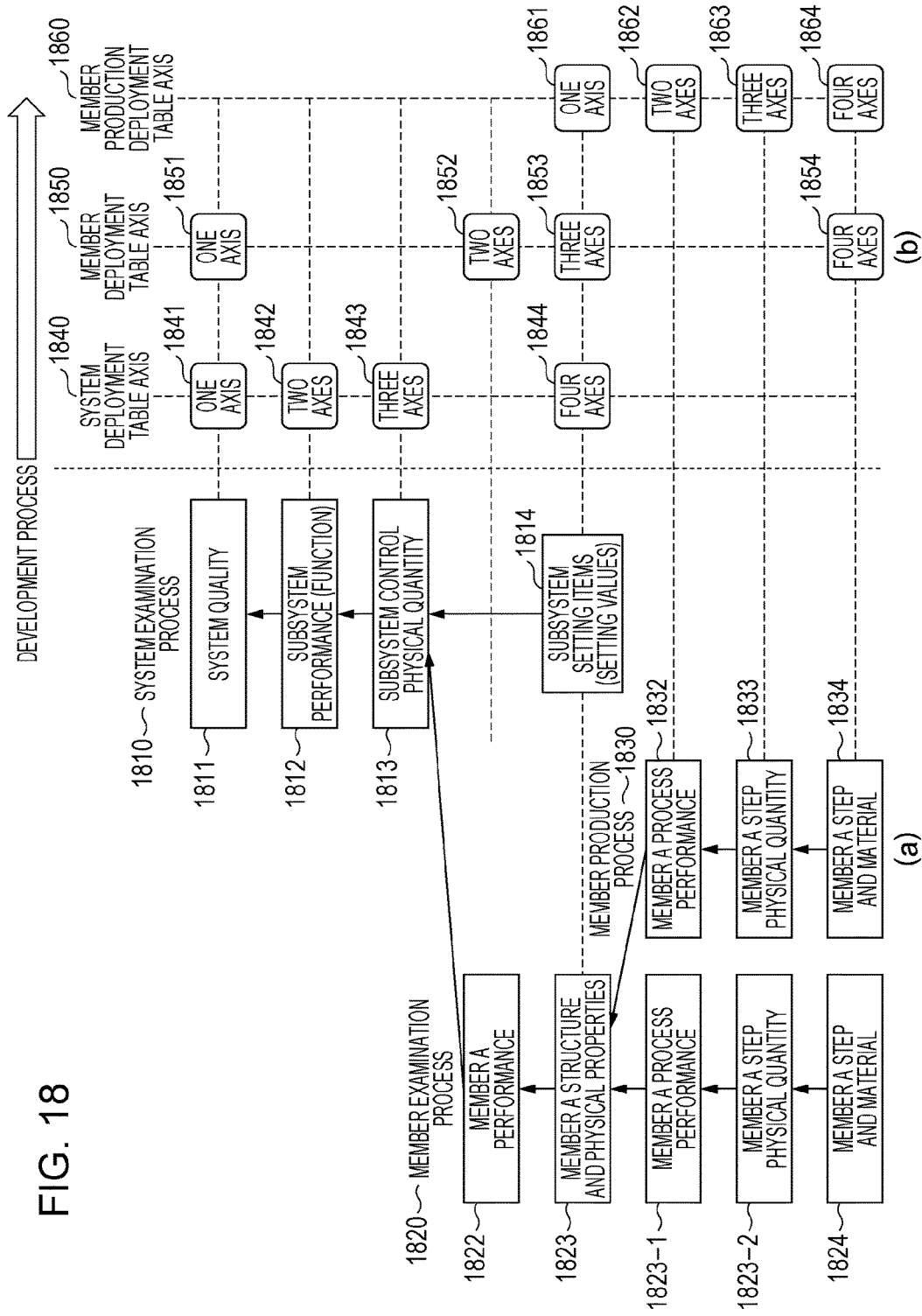
FIG. 18 is a diagram illustrating an example of changes in axis items in a development process.

FIG. 18 is a diagram illustrating an example of changes in axis items in a development process.

A deployment table becomes more detailed as a development process (steps) progresses. In the example illustrated in FIG. 18, the deployment table becomes more detailed in order of a system deployment table (axes 1840 of the system deployment table), a member deployment table (axes 1850 of the member deployment table), and a member production deployment table (axes 1860 of the member production deployment table). It is therefore common to make a part of an axis configuration defined in an upstream process more detailed. If a control physical quantity that contributes to the performance of a system and a specific setting value of the control physical quantity are defined in the system deployment table, for example, the control physical quantity and the specific setting value are further defined as performance assigned to the downstream process (member examination process 1820) in order to achieve the control physical quantity (a control physical quantity 1813 of each subsystem) and a setting value (a setting item (a setting item (setting value) 1814 of the subsystem). In a yet downstream process (member production examination process 1830), process performance and a step physical quantity are defined in order to achieve a structure and a physical property for achieving the assigned performance. The axes are thus made more detailed as the process progresses.

The above development process will be described in more detail.

In the development process, the system deployment table (the axes 1840 of the system deployment table), the member deployment table (the axes 1850 of the member deployment table), and the member production deployment table (the axes 1860 of the member production deployment table) are created in this order.

(1) In a system examination process 1810, the setting item (setting value) 1814 of each subsystem, the control physical quantity 1813 of the subsystem, the performance (function) 1812 of the subsystem, and a system quality 1811 are examined, and results of the examination are created as a fourth axis 1844, a third axis 1843, a second axis 1842, and a first axis 1841, respectively, of the axes 1840 of the system deployment table.

(2) Next, in the member examination process, steps and a material 1824 of a member A, a step physical quantity 1823-2 of the member A, process performance 1823-1 of the member A, a structure and a physical property 1823 of the member A, performance 1822 of the member A are examined, and results of the examination are created as a fourth axis 1854, a third axis 1853, a second axis 1852, and a first axis 1851, respectively, of the axes 1850 of the member deployment table. A next step of the performance 1822 of the member A is the control physical quantity 1813 of each subsystem in the system examination process 1810, which indicates that the member examination process 1820 is a process downstream of the control physical quantity 1813 of each subsystem of the system examination process 1810.

The steps and material 1824 of the member A correspond to the fourth axis 1854, the structure and physical property 1823 of the member A correspond to the third axis 1853, the performance 1822 of the member A corresponds to the second axis 1852, and the system quality 1811 corresponds to the first axis 1851.

The step physical quantity 1823-2 of the member A and the process performance 1823-1 of the member A are omitted in the axes 1850 of the member deployment table. In a relationship between the axes 1840 of the system deployment table and the axes 1850 of the member deployment table, the first axis 1851 is the same as the first axis 1841, and the third axis 1853 is the same as the fourth axis 1844.

That is, the second axis 1852 is added between the first axis 1841 (first axis 1851) and the fourth axis 1844 (third axis 1853) of the axes 1840 of the system deployment table to create the axes 1850 of the member deployment table.

This, therefore, is an example in which a new axis, namely the second axis 1852, is inserted between axes.

(3) In the member production examination process 1830, steps and a material 1834 of the member A, a step physical quantity 1833 of the member A, process performance 1832 of the member A, and the structure and physical quantity 1823 of the member A are examined in this order, and results of the examination are created as a fourth axis 1864, a third axis 1863, a second axis 1862, and a first axis 1861, respectively, of the axes 1860 of the member production deployment table. A next step of the process performance 1832 of the member A is the structure and physical property 1823 of the member A in the member examination process 1820, which indicates that the member production examination process 1830 is a process downstream of the structure and physical property 1823 of the member A in the member examination process 1820.

In a relationship between the axes 1850 of the member deployment table and the axes 1860 of the member production deployment table, the first axis 1861 is the same as the third axis 1853, and the fourth axis 1864 is the same as the fourth axis 1854.

That is, the second axis 1862 and the third axis 1863 are added between the third axis 1853 (first axis 1861) and the fourth axis 1854 (fourth axis 1864) of the axes 1850 of the member deployment table to create the axes 1860 of the member production deployment table.

This, therefore, is an example in which new axes, namely the second axis 1862 and the third axis 1863, are inserted between axes.

Figure 19:
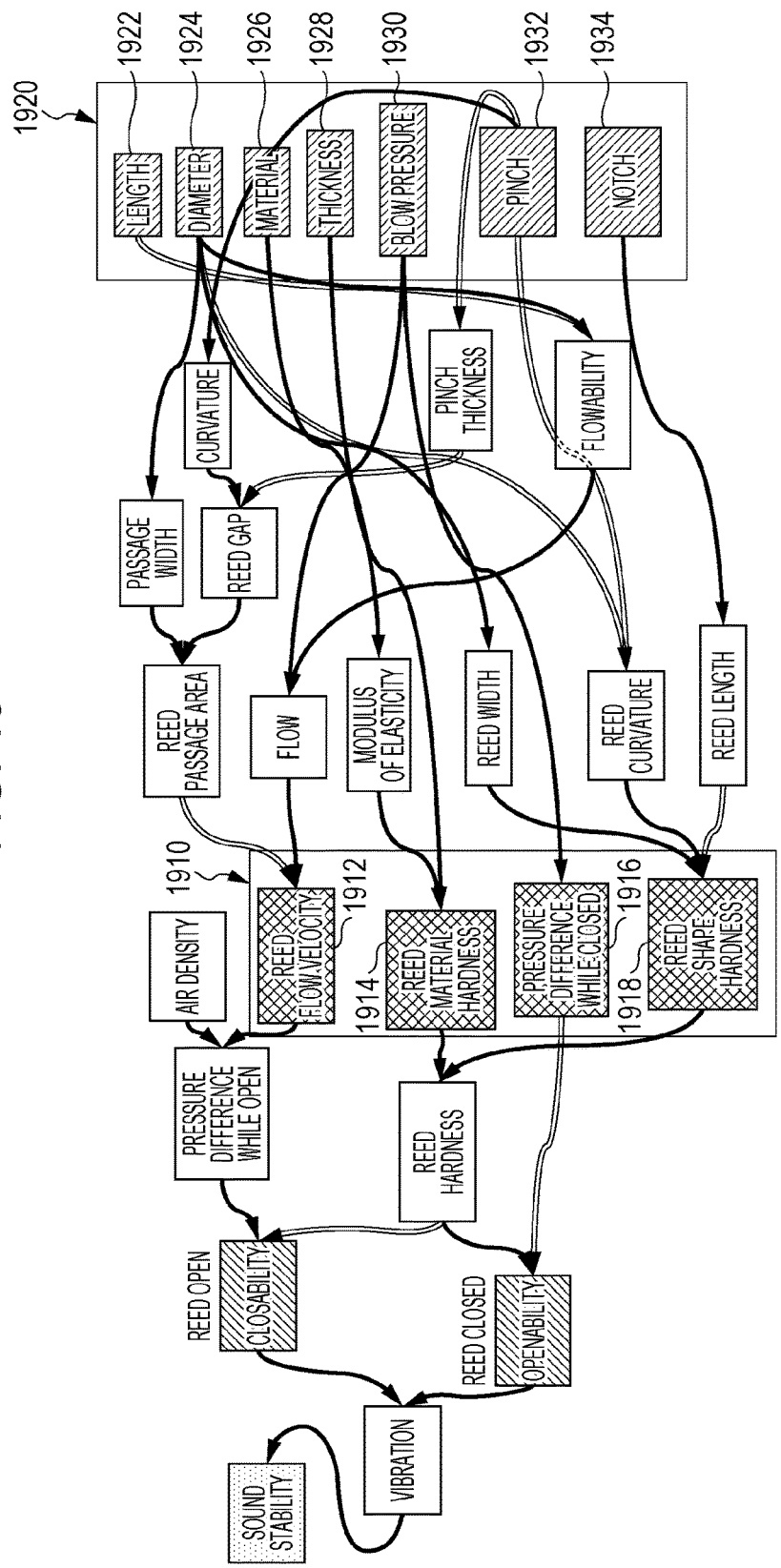
FIG. 19 is a diagram illustrating another example of the relations diagram.

FIG. 19 is a diagram illustrating an example of a relations diagram.

A third axis item group 1910 includes an item (reed fluid velocity) 1912, an item (reed material hardness) 1914, an item (pressure difference while closed) 1916, and an item (reed material hardness) 1918.

A fourth axis item group 1920 includes an item (length) 1922, an item (diameter) 1924, an item (material) 1926, an item (thickness) 1928, an item (blow pressure) 1930, an item (pinch) 1932, and an item (notch) 1934.

In the relations diagram illustrated in FIG. 19, a new axis is set between a third axis and a fourth axis of a corresponding deployment table. More specifically, a new axis of the deployment table is inserted between the third axis item group 1910 (corresponds to the axis (control physical quantity) 825A in the example illustrated in FIG. 8) and the fourth axis item group 1920 (corresponds to the axis (design/setting items) 845A in the example illustrated in FIG. 8). If a new axis is inserted in the deployment table, therefore, a new item needs to be inserted between the third axis item group 1910 and the fourth axis item group 1920. In this case, as described above, the relations diagram might include an item that is not included in the deployment table. In the example illustrated in FIG. 19, "reed passage area", "flow", "modulus of elasticity", and the like are not used as axis items of the deployment table. If the information processing apparatus 100 is not used and the user is allowed to perform operations, therefore, the user needs to insert items and examine positions at which the items are to be inserted.

Figure 20:
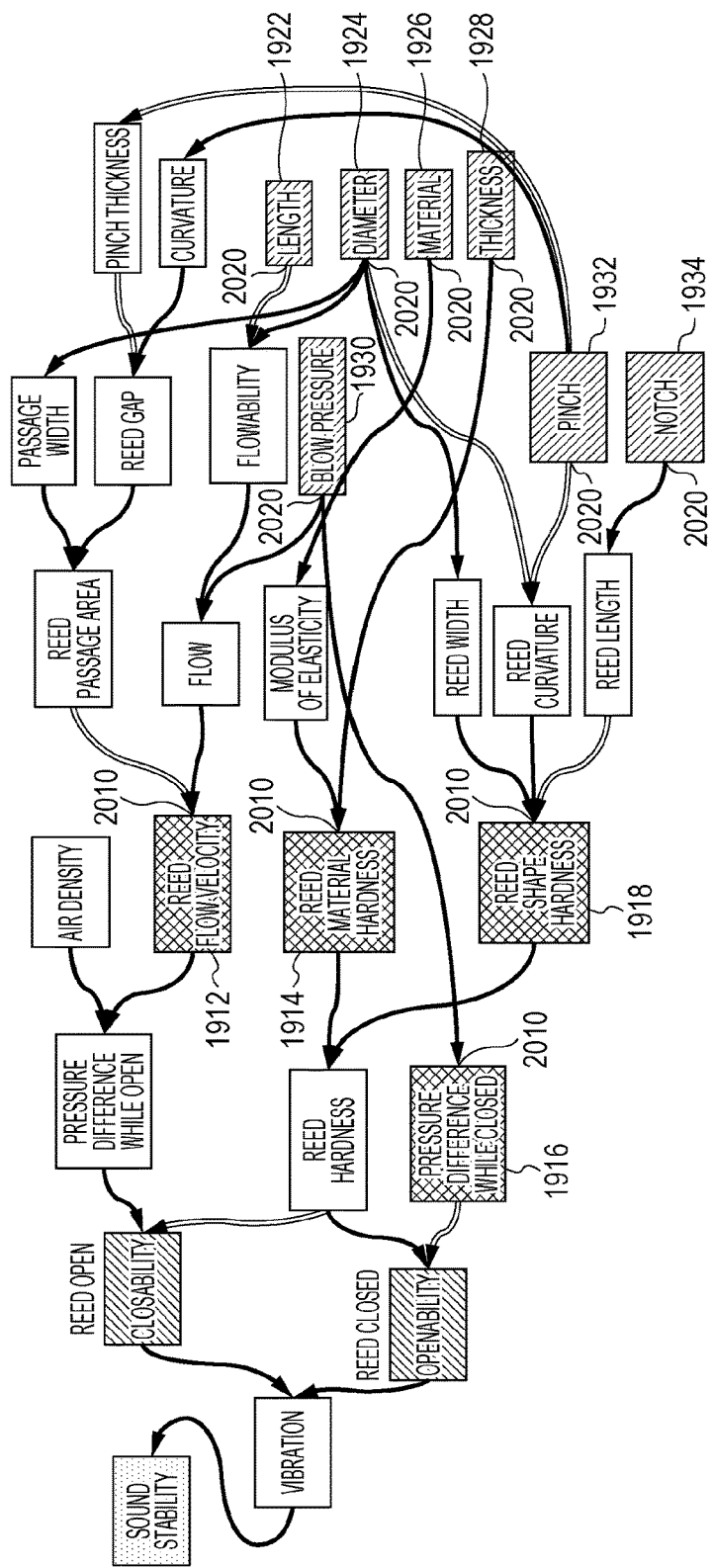
FIG. 20 is a diagram illustrating an example of a process according to the exemplary embodiment.

FIG. 20 is a diagram illustrating an example of a process according to the present exemplary embodiment.

If a new axis is inserted between the axis (control physical quantity) 825A (corresponds to the third axis item group 1910 in the example illustrated in FIG. 9) and the axis (design/setting items) 845A (corresponds to the fourth axis item group 1920 in the example illustrated in FIG. 9) of the deployment table, new items (dummy items) are inserted into insertion positions 2010 or 2020.

The insertion positions 2010 are located immediately before the item (reed fluid velocity) 1912, the item (reed material hardness) 1914, the item (pressure difference while closed) 1916, and the item (reed shape hardness) 1918. That is, the insertion positions 2010 indicate that dummy items are inserted immediately upstream of the items (the item (reed fluid velocity) 1912, the item (reed material hardness) 1914, the item (pressure difference while closed) 1916, and the item (reed shape hardness) 1918) corresponding to axis items of a target axis.

The insertion positions 2020 are located immediately after the item (length) 1922, the item (diameter) 1924, the item (material) 1926, the item (thickness) 1928, the item (blow pressure) 1930, the item (pinch) 1932, and the item (notch) 1934. That is, the insertion positions 2020 indicate that dummy items are inserted immediately downstream of the items (the item (length) 1922, the item (diameter) 1924, the item (material) 1926, the item (thickness) 1928, the item (blow pressure) 1930, the item (pinch) 1932, and the item (notch) 1934) corresponding to axis items of a target axis.

Figure 21:
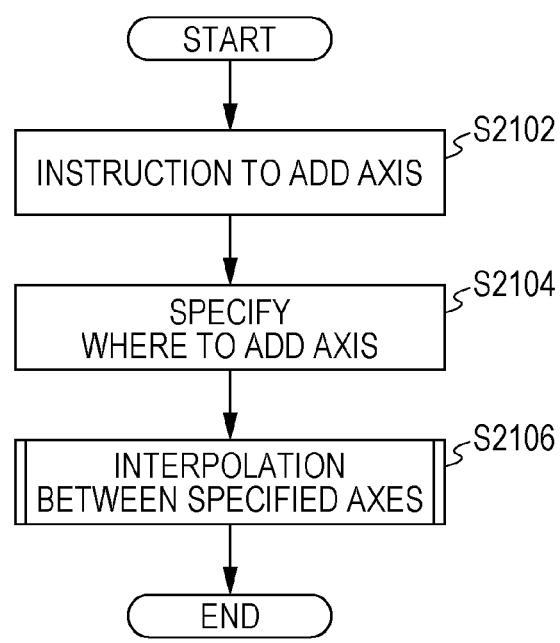
FIG. 21 is a flowchart illustrating an example of a process according to the exemplary embodiment.

FIG. 21 is a flowchart illustrating an example of a process according to the present exemplary embodiment.

In step S2102, an instruction to add an axis is received in accordance with an operation performed by the user.

In step S2104, a place where the axis is to be added is received in accordance with an operation performed by the user. This step corresponds to the operation for selecting the axis (control physical quantity) 825A and the axis (design/setting items) 845A in the above example, and a new axis is inserted between these axes.

In step S2106, interpolation between the specified axes is performed. Details of step S2106 will be described hereinafter with reference to a flowchart illustrated in FIG. 22.

Figure 22:
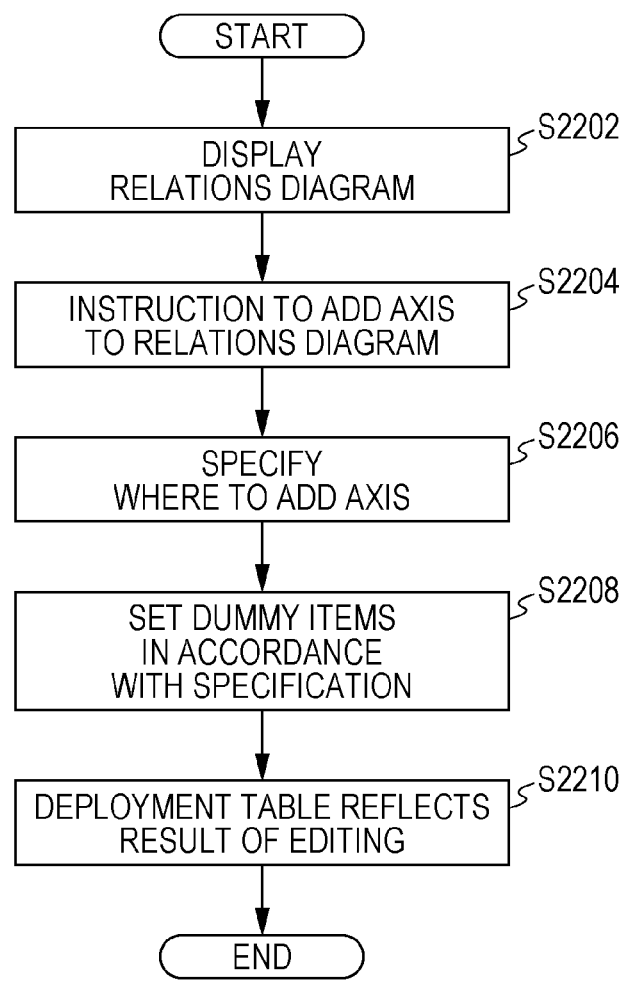
FIG. 22 is a flowchart illustrating an example of a process according to the exemplary embodiment.

FIG. 22 is a flowchart illustrating an example of a process according to the present exemplary embodiment.

In step S2202, a relations diagram corresponding to a target deployment table is displayed.

In step S2204, an instruction to add an axis to the relations diagram is received in accordance with an operation performed by the user.

In step S2206, places where items are to be added in accordance with the addition of the axis are specified. In the example illustrated in FIG. 20, the insertion positions 2010 and 2020 are presented, and the user selects either the insertion positions 2010 or the insertion positions 2020.

In step S2208, dummy items are set in accordance with the specified places. The dummy items are edited in the relations diagram in accordance with an operation performed by the user. More specifically, this step corresponds to an operation for writing names of the items to the items.

In step S2210, the deployment table reflects a result of the editing. That is, the deployment table generation module 115 generates a deployment table on the basis of the edited relations diagram.

Figure 23:
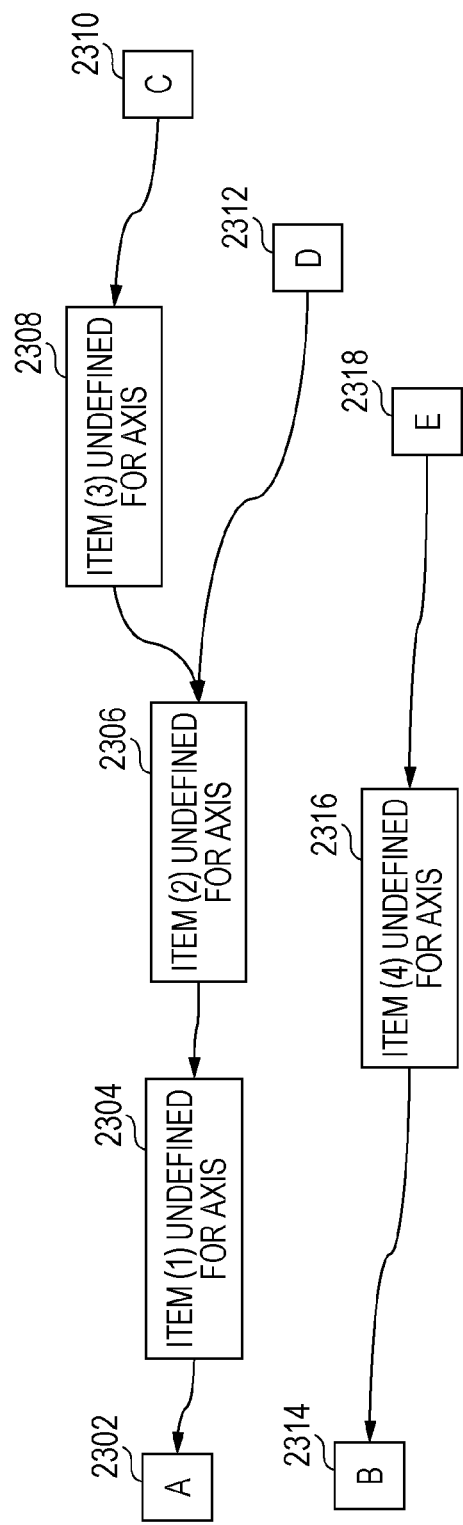
FIG. 23 is a diagram illustrating an example of a process for a relations diagram according to the exemplary embodiment.
Figure 24:
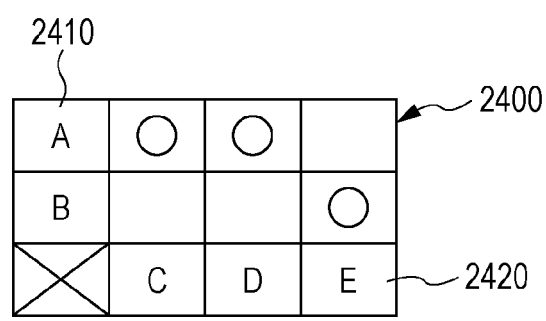
FIG. 24 is a diagram illustrating an example of a process for a deployment table according to the exemplary embodiment.

FIG. 23 is a diagram illustrating an example of a process for a relations diagram according to the present exemplary embodiment. FIG. 24 is a diagram illustrating an example of a process for a deployment table according to the present exemplary embodiment. The deployment table generation module 115 generates a deployment table 2400 in the example illustrated in FIG. 24 from the relations diagram in the example illustrated in FIG. 23.

An axis item A (item A 2302) of a first axis 2410 in the example illustrated in FIG. 24 is related to an axis item C (item C 2310) and an axis item D (item D 2312) of a second axis 2420. An axis item B (item B 2314) of the first axis 2410 is related to an axis item E (item E 2318) of the second axis 2420.

The axis item A of the first axis 2410 of the deployment table 2400 reflects the item A 2302 in the example illustrated in FIG. 23. The axis item C of the second axis 2420 of the deployment table 2400 reflects the item C 2310. The axis item D of the second axis 2420 of the deployment table 2400 reflects the item D 2312. The axis item B of the first axis 2410 of the deployment table 2400 reflects the item B 2314. The axis item E of the second axis 2420 of the deployment table 2400 reflects the item E 2318.

The deployment table 2400 does not reflect an item (an item (1) undefined by an axis) 2304, an item (an item (2) undefined by an axis) 2306, an item (an item (3) undefined by an axis) 2308, and an item (an item (4) undefined by an axis) 2316.

The item C 2310 is a factor in the item A 2302 through the item (the item (3) undefined by an axis) 2308, the item (the item (2) undefined by an axis) 2306, and the item (the item (1) undefined by an axis) 2304. The item D 2312 is a factor in the item A 2302 through the item (the item (2) undefined by an axis) 2306 and the item (the item (1) undefined by an axis) 2304. The item E 2318 is a factor in the item B 2314 through the item (the item (4) undefined by an axis) 2316.

This is based on cells (cause-and-effect information) of the deployment table 2400, which indicate that the axis item C of the second axis 2420 is a factor in the axis item A of the first axis 2410, the axis item D of the second axis 2420 is a factor in the axis item A of the second axis 2420, and the axis item E of the second axis 2420 is a factor in the axis item B of the first axis 2410.

Since there are one or more items (the item (the item (2) undefined by an axis) 2306 and the item (the item (4) undefined by an axis) 2316 or the like) between target items (between the item C 2310 and the item A 2302, between the item D 2312 and the item A 2302, and between the item E 2318 and the item B 2314) in the relations diagram in the example illustrated in FIG. 23, dummy items are inserted. Dummy items are items that can be moved or deleted. The dummy items need not ultimately be used as axis items, and items (the item (the item (2) undefined by an axis) 2306 and the item (the item (4) undefined by an axis) 2316 or the like) between target items may be used as axis items.

If there is no item between target items, an item may be inserted between the target items. More specifically, in the example illustrated in FIG. 23, this holds true when the item (the item (2) undefined by an axis) 2306 and the item (the item (4) undefined by an axis) 2316 or the like do not exist and the item C 2310 and the item A 2302, the item D 2312 and the item A 2302, and the item E 2318 and the item B 2314 are directly connected to each other. In this case, items may be inserted between the item C 2310 and the item A 2302, between the item D 2312 and the item A 2302, and between the item E 2318 and the item B 2314. The items to be inserted may be dummy items.

Needless to say, if a name of an inserted item is corrected in a relations diagram in accordance with an operation performed by the user, a name of an axis item corresponding to the inserted item in a deployment table generated from the relations diagram is also corrected.

It is assumed here that an instruction to insert a new axis between the first axis 2410 and the second axis 2420 of the deployment table 2400 is issued.

Figure 25:
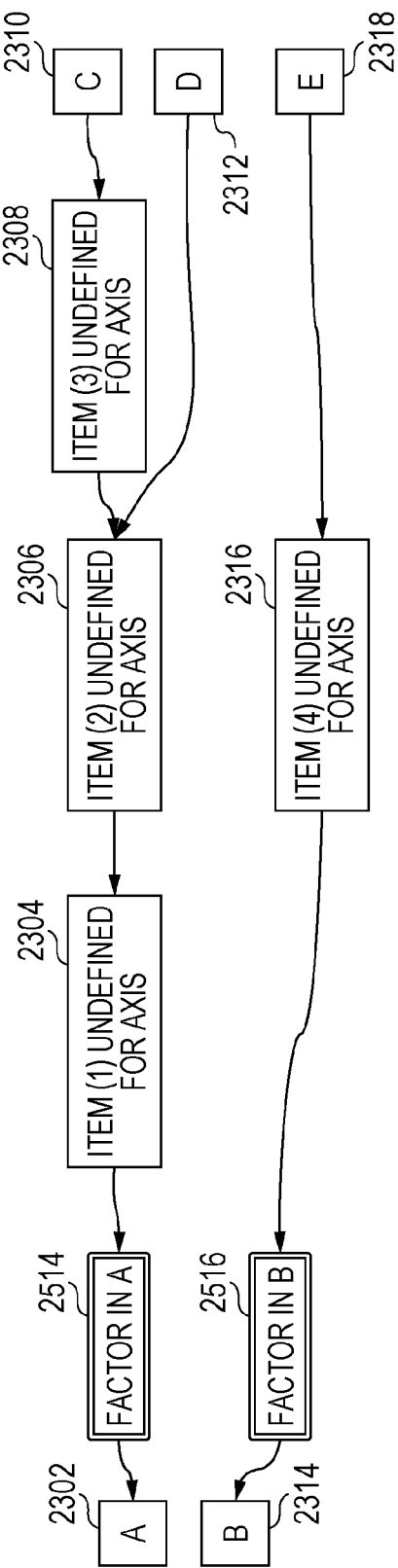
FIG. 25 is a diagram illustrating another example of the process for a relations diagram according to the exemplary embodiment.
Figure 26:
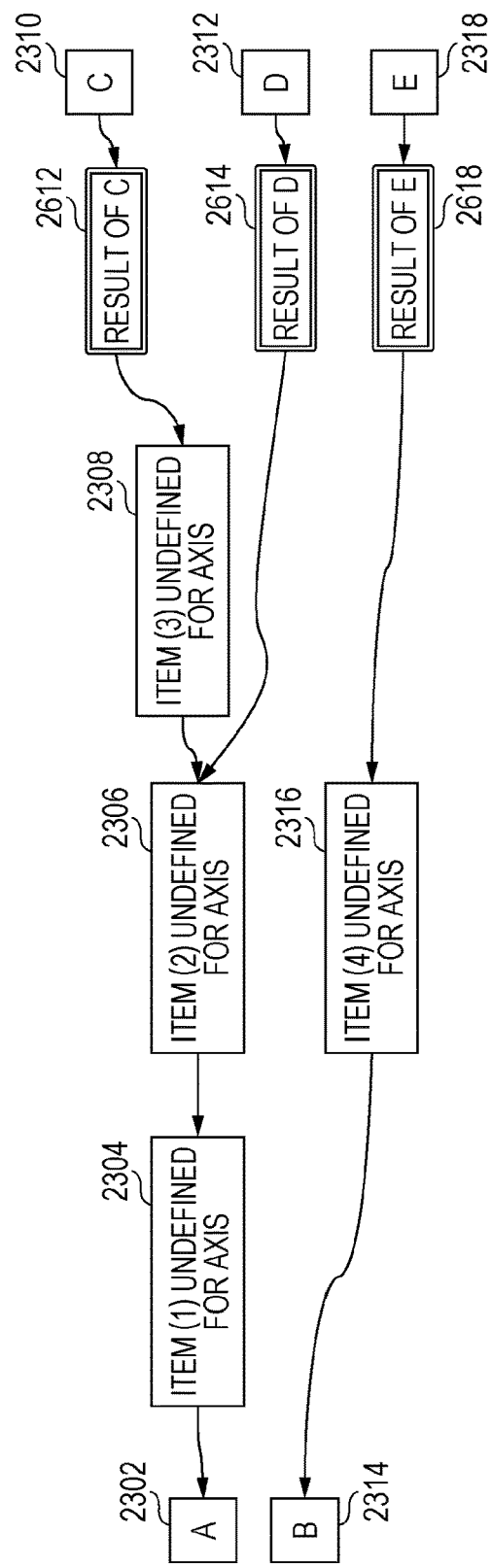
FIG. 26 is a diagram illustrating another example of the process for a relations diagram according to the exemplary embodiment.

In this case, a relations diagram in an example illustrated in FIG. 25 or a relations diagram in an example illustrated in FIG. 26 are displayed. Alternatively, both the relations diagram illustrated in FIG. 25 and the relations diagram illustrated in FIG. 26 may be displayed, and the user may select either of the relations diagram.

FIG. 25 is a diagram illustrating an example of a process for the relations diagram according to the present exemplary embodiment. An item (a factor in A) 2514 is inserted immediately before the item A 2302, and an item (a factor in B) 2516 is inserted immediately before the item B 2314. With respect to dummy items, a name of the item (a factor in A) 2514 is "a factor in A", and a name of the item (a factor in B) 2516 is "a factor in B". The names of the items can be corrected by the user. Needless to say, if the names of the items are corrected, names of axis items in a deployment table are also corrected to new names.

FIG. 26 is a diagram illustrating an example of a process for the relations diagram according to the present exemplary embodiment. An item (a result of C) 2612 is inserted immediately after the item C 2310, an item (a result of D) 2614 is inserted immediately after the item D 2312, and an item (a result of E) 2618 is inserted immediately after the item E 2318. With respect to dummy items, a name of the item (a result of C) 2612 is "a result of C", a name of the item (a result of D) 2614 is "a result of D", and a name of the item (a result of E) 2618 is "a result of D". Needless to say, if the names of the items are changed, names of axis items in a deployment table are also changed to new names.

Figures 27, 28:
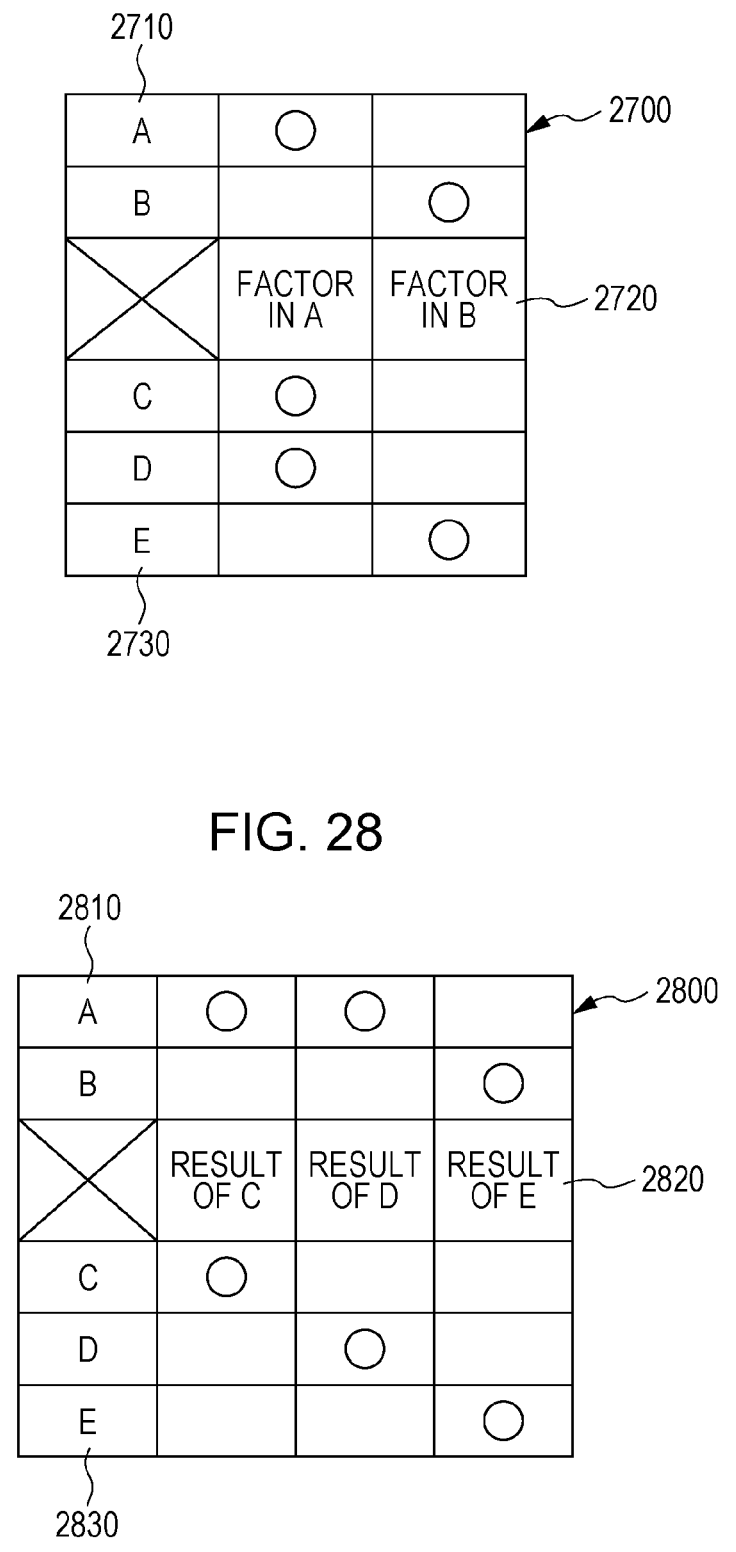

FIG. 27 is a diagram illustrating an example of a process for a deployment table according to the present exemplary embodiment.

The deployment table generation module 115 generates a deployment table 2700 in the example illustrated in FIG. 27 from the relations diagram in the example illustrated in FIG. 25.

An axis item A (item A 2302) of a first axis 2710 is related to a factor (item (a factor in A) 2514) of an axis item A of a second axis 2720. An axis item B (item B 2314) of the first axis 2710 is related to a factor (item (a factor in B) 2516) of an axis item B of the second axis 2720. An axis item C (item C 2310) of a third axis 2730 is related to a factor (item (a factor in A) 2514) of the axis item A of the second axis 2720. An axis item D (item D 2312) of the third axis 2730 is related to a factor (item (a factor in A) 2514) of the axis item A of the second axis 2720. An axis item E (item E 2318) of the third axis 2730 is related to a factor (item (a factor in B) 2516) of the axis item B of the second axis 2720.

FIG. 28 is a diagram illustrating an example of a process for a deployment table according to the present exemplary embodiment.

The deployment table generation module 115 generates a deployment table 2800 in an example illustrated in FIG. 28 from the relations diagram in the example illustrated in FIG. 26.

An axis item A (item A 2302) of a first axis 2810 is related to a result (item (a result of C) 2612) of an axis item C of a second axis 2820 and a result (item (a result of D) 2614) of an axis item D of the second axis 2820. An axis item B (item B 2314) of the first axis 2810 is related to a result (item (a result of E) 2618) of an axis item E of the second axis 2820. An axis item C (item C 2310) of a third axis 2830 is related to a result (item (a result of C) 2612) of the axis item C of the second axis 2820. An axis item D (item D 2312) of the third axis 2830 is related to a result (item (a result of D) 2614) of the axis item D of the second axis 2820. An axis item E (item E 2318) of the third axis 2830 is related to a result (item (a result of E) 2618) of the axis item E of the second axis 2820.

Figure 29:
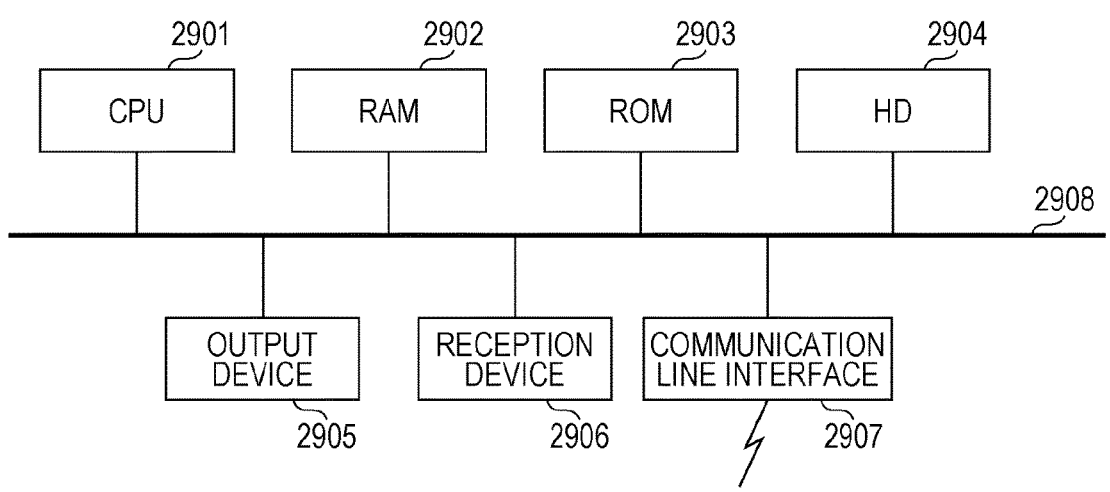
FIG. 29 is a block diagram illustrating an example of the hardware configuration of a computer that achieves the exemplary embodiment.

As illustrated in FIG. 29, the hardware configuration of a computer that executes a program according to the present exemplary embodiment is a common computer and, more specifically, a personal computer, a computer that can be a server, or the like. That is, in a specific example, a CPU 2901 is used as a processing unit (computing unit), and a random-access memory (RAM) 2902, a read-only memory (ROM) 2903, and a hard disk (HD) 2904 are used as storage devices. As the HD 2904, for example, a hard disk or a solid-state drive (SSD) may be used. The computer includes the CPU 2901 that executes programs such as the relations diagram and deployment table creation module 105, the relations diagram creation module 110, the deployment table generation module 115, the output module 120, the edit module 145, the deployment table operation reception module 150, the related information extraction module 155, the display module 160, and the relations diagram edit module 165, the RAM 2902 storing the programs and data, the ROM 2903 storing a program for activating the computer and the like, the HD 2904 that is an auxiliary storage device (may be a flash memory or the like) having the functions of the relations diagram and deployment table storage module 125, the relations diagram storage module 130, the deployment table storage module 135, and the relations diagram and deployment table association storage module 140, a reception device 2906 that receives data on the basis of an operation performed by a user on a keyboard, a mouse, a touch screen, a microphone, a camera (includes a line-of-sight detection camera), or the like, an output device 2905 such as a cathode ray tube (CRT), a liquid crystal display, or a speaker, a communication line interface 2907 for connecting to a communication network, such as a network interface card, and a bus 2908 connecting these components to one another to communicate data. Plural computers may be connected to one another through a network.

The present exemplary embodiment can be achieved by causing a system having the above hardware configuration to read the computer program to operate software and hardware resources together.

The hardware configuration illustrated in FIG. 29 is an example, and the present exemplary embodiment is not limited to the configuration illustrated in FIG. 29. Any configuration capable of achieving the modules described in the present exemplary embodiment may be used. For example, some modules may be achieved by dedicated hardware (e.g., an application-specific integrated circuit (ASIC)), and some other modules may be provided in an external system and connected through a communication line. Furthermore, plural systems illustrated in FIG. 29 may be connected to one another through a communication line and operate together. The hardware configuration may be employed by a mobile information communication device (a mobile phone, a smartphone, a mobile device, a wearable computer, or the like), an information home appliance, a robot, a copying machine, a facsimile, a scanner, a printer, a multi-function device (an image processing device having at least two of functions of a scanner, a printer, a copying machine, a facsimile, and the like), or the like, instead of a personal computer.

Although a case in which one axis is inserted in a deployment table has been described in the above example of the process according to the present exemplary embodiment, two or more axes may be inserted in a deployment table. In this case, a process may be performed such that the above example of the process is repeated plural times (the number of axes to be inserted). Alternatively, dummy items to be inserted in a relations diagram corresponding to the deployment table may be plural dummy items (the number of axes to be inserted) directly connected to one another.

The above-described program may be stored in a recording medium and provided or provided through a communication medium. In this case, for example, the program may be regarded as an invention of a computer readable recording medium storing the program.

The computer readable recording medium storing the program refers to a computer readable recording medium storing the program used to install, execute, and distribute the program.

The recording medium may be, for example, a digital versatile disc recordable (DVD-R), a DVD rewritable (DVD-RW) a DVD-RAM, or the like specified by a DVD forum, a DVD+R, a DVD+RW, or the like specified by DVD+RW, a compact disc ROM (CD-ROM), a CD recordable (CD-R), a CD rewritable (CD-RW), a Blu-ray disc (registered trademark), a magneto-optical (MO) disk, a flexible disk (FD), a magnetic tape, a hard disk, a ROM, an electrically erasable programmable read-only memory (EE-PROM), a flash memory, a RAM, a secure digital (SD) memory card, or the like.

The entirety or a part of the program may be recorded in the recording medium and stored or distributed. As for communication, a wired or wireless network used for a local area network (LAN), a metropolitan area network (MAN), a wide area network (WAN), the Internet, an intranet, an extranet, or the like, or a combination thereof, for example, may be used to transmit the program. Alternatively, the program may be transmitted through carrier waves.

Furthermore, the program may be a part or the entirety of another program, or may be recorded in a recording medium along with another program. The program may be divided and recorded in plural recording media. The program may be compressed or encrypted. The program may be recorded in any manner insofar as the program can be restored.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an extraction unit that extracts, if a third axis is inserted between a first axis and a second axis adjacent to each other in a deployment table, a relations diagram associated with the deployment table; and
   an insertion unit that inserts, in the relations diagram, a third item relating to an axis item of the third axis between a first item relating to an axis item of the first axis and a second item relating to an axis item of the second axis.

2. The information processing apparatus according to claim 1,
   wherein, if there are one or more items between the first and second items in the relations diagram, the insertion unit inserts the third item as a temporary item.

3. The information processing apparatus according to claim 2,
   wherein the insertion unit inserts the third item immediately before the second item or immediately after the first item.

4. The information processing apparatus according to claim 3,
   wherein the insertion unit inserts the third item in a manner that allows a user to correct the third item.

5. The information processing apparatus according to claim 4,
   wherein the insertion unit does not allow the third item to be inserted at a position other than between the first item and the second item.

6. The information processing apparatus according to claim 1,
   wherein, if there is no item between the first and second items in the relations diagram, the insertion unit inserts the third item.

7. The information processing apparatus according to claim 6,
   wherein, if a user is allowed to correct the third item and the user has corrected the third item, the axis item of the third axis in the deployment table corresponding to the third item is corrected.

8. A non-transitory computer readable medium storing a program causing a computer to execute a process for processing information, the process comprising:
   extracting, if a third axis is inserted between a first axis and a second axis adjacent to each other in a deployment table, a relations diagram associated with the deployment table; and
   inserting, in the relations diagram, a third item relating to an axis item of a the third axis between a first item relating to an axis item of the first axis and a second item relating to an axis item of the second axis.

* * * * *